US 11,855,730 B2

(12) United States Patent
Choi et al.

(10) Patent No.: US 11,855,730 B2
(45) Date of Patent: Dec. 26, 2023

(54) APPARATUS AND METHOD FOR RECONSTRUCTING DOWNLINK CHANNEL IN WIRELESS COMMUNICATION SYSTEM

(71) Applicants: Samsung Electronics Co., Ltd., Suwon-si (KR); KOREA ADVANCED INSTITUTE OF SCIENCE AND TECHNOLOGY, Daejeon (KR)

(72) Inventors: Yongyun Choi, Suwon-si (KR); Chulhee Jang, Suwon-si (KR); Hyeongtaek Lee, Daejeon (KR); Junil Choi, Daejeon (KR); Hwanjin Kim, Daejeon (KR)

(73) Assignees: Samsung Electronics Co., Ltd., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 17/703,379

(22) Filed: Mar. 24, 2022

(65) Prior Publication Data
US 2022/0224388 A1    Jul. 14, 2022

Related U.S. Application Data

(63) Continuation of application No. PCT/KR2020/013021, filed on Sep. 25, 2020.

(30) Foreign Application Priority Data

Sep. 27, 2019    (KR) ........................ 10-2019-0119613

(51) Int. Cl.
*H04B 7/06*    (2006.01)
*H04B 7/08*    (2006.01)
(Continued)

(52) U.S. Cl.
CPC .......... *H04B 7/0634* (2013.01); *H04B 7/086* (2013.01); *H04L 5/0048* (2013.01); *H04W 72/23* (2023.01); *H04W 72/54* (2023.01)

(58) Field of Classification Search
CPC ..... H04W 24/00; H04W 12/04; H04W 24/02; H04W 28/0215; H04W 28/065;
(Continued)

(56) References Cited

U.S. PATENT DOCUMENTS 9,762,301 B2    9/2017  Kim et al.
10,164,720 B2   12/2018 Rong et al.
(Continued)

FOREIGN PATENT DOCUMENTS

KR    10-2010-0044258 A    4/2010
KR    10-2016-0023666 A    3/2016
KR    10-2017-0085113 A    7/2017

OTHER PUBLICATIONS

Intel Corporation, Downlink and Uplink Reference Signals for NR Positioning, 3GPP TSG RAN WG1 Meeting #96bis R1-1904320, Xi'an, China, Apr. 8-12, 2019.

*Primary Examiner* — Eva Y Puente
(74) *Attorney, Agent, or Firm* — Jefferson IP Law, LLP

(57) ABSTRACT

The disclosure relates to a 5$^{th}$ generation (5G) or pre-5G communication system for supporting a higher data rate after a 4$^{th}$ generation (4G) communication systems such as long term evolution (LTE). The disclosure is for reconstructing a downlink channel in a wireless communication system. An operation method for a base station is provided. The operation method includes the steps of transmitting downlink reference signals (RSs) to a terminal, receiving an indication of a first channel matrix estimated by the terminal and at least one uplink RS; estimating a second channel matrix on the basis of the at least one uplink RS, and on the
(Continued)

basis of the first channel matrix and the second channel matrix, reconstructing channel information to be used for data transmission.

18 Claims, 14 Drawing Sheets

(51) Int. Cl.
*H04L 5/00* (2006.01)
*H04W 72/23* (2023.01)
*H04W 72/54* (2023.01)

(58) Field of Classification Search
CPC ... H04W 88/00; H04B 7/0626; H04B 7/0639; H04B 7/0417; H04B 7/0456; H04B 7/043; H04B 7/0478; H04B 7/0663; H04L 1/0026; H04L 5/0035; H04L 1/0015; H04L 1/0031; H04L 2025/03414; H04L 25/0202; H04L 25/03955

USPC .......................................................... 375/289
See application file for complete search history.

(56) References Cited

U.S. PATENT DOCUMENTS

| | | | |
|---|---|---|---|
| 10,419,245 B2 | 9/2019 | Frank et al. | |
| 10,461,821 B1 * | 10/2019 | Nammi | H04B 7/0634 |
| 10,979,119 B2 * | 4/2021 | Bontu | H04L 25/0206 |
| 2009/0046800 A1 | 2/2009 | Xu et al. | |
| 2012/0115470 A1 | 5/2012 | Zhuang et al. | |
| 2012/0190309 A1 * | 7/2012 | Tang | H04B 7/065 |
| | | | 455/69 |
| 2013/0064315 A1 * | 3/2013 | Heath, Jr. | H04B 7/0456 |
| | | | 455/561 |
| 2016/0143013 A1 | 5/2016 | Kim et al. | |
| 2017/0279505 A1 | 9/2017 | Zhang et al. | |
| 2018/0006845 A1 | 1/2018 | Kim et al. | |
| 2021/0067294 A1 * | 3/2021 | Farmanbar | H04L 5/0091 |

* cited by examiner

APPARATUS AND METHOD FOR RECONSTRUCTING DOWNLINK CHANNEL IN WIRELESS COMMUNICATION SYSTEM

CROSS-REFERENCE TO RELATED APPLICATION(S)

This application is a continuation application, claiming priority under § 365(c), of an International application No. PCT/KR2020/013021, filed on Sep. 25, 2020, which is based on and claims the benefit of a Korean patent application number 10-2019-0119613, filed on Sep. 27, 2019, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., Ltd., and 2) KOREA ADVANCED INSTITUTE OF SCIENCE AND TECHNOLOGY.

BACKGROUND

1. Field

The disclosure relates to a wireless communication system. More particularly, the disclosure relates to an apparatus and a method for reconstructing a downlink channel in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (post LTE)" system.

The 5G communication system is considered to be implemented in ultra-higher frequency (mm Wave) bands (e.g., 60 GHz bands) so as to accomplish higher data rates. To decrease the propagation loss and increase the transmission distance of the radio waves in the ultra-higher frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, technical development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying and quadrature amplitude modulation (FQAM) and sliding window superposition coding (SWSC) as an advanced coding modulation (ACM) scheme, and filter bank multi carrier (FBMC), non-orthogonal multiple access (NOMA), and sparse code multiple access (SCMA) as an advanced access technology have also been developed.

In 5G systems, massive multiple-input multiple-output (massive MIMO) systems which use a large number of antennas for transmitters and receivers are considered as one of critical technologies in future wireless communication systems, and there has been extensive research regarding the same. In order to obtain a sufficient gain through a massive MIMO system, a base station requires channel state information (CSI). Accordingly, there have been various kinds of ongoing research for acquiring CIS effectively.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for effectively acquiring channel-related information in a wireless communication system.

Another aspect of the disclosure is to provide an apparatus and a method for acquiring channel state information (CSI) by using an antenna sub-array in a wireless communication system.

Another aspect of the disclosure is to provide an apparatus and a method for acquiring channel state information for spatial multiplexing in a wireless communication system.

Additional aspects will be set forth in part in the description which follows and, in part, will be apparent from the description, or may be learned by practice of the presented embodiments.

In accordance with an aspect of the disclosure, an operation method of a base station in a wireless communication system is provided. The operation method includes transmitting downlink reference signals (RSs) to a terminal, receiving an indication for a first channel matrix inferred by the terminal and at least one uplink RS, inferring a second channel matrix based on the at least one uplink RS, and reconstructing channel information to be used for data transmission based on the first channel matrix and the second channel matrix.

In accordance with another aspect of the disclosure, a base station in a wireless communication system is provided. The base station includes a transceiver and at least one processor connected to the transceiver. The at least one processor may be controlled to transmit downlink reference signals (RSs) to a terminal, receive an indication for a first channel matrix inferred by the terminal and at least one uplink RS, infer a second channel matrix based on at least one uplink RS, and reconstruct channel information to be used for data transmission based on the first channel matrix and the second channel matrix.

An apparatus and a method according to various embodiments of the disclosure may improve the performance of a communication system through spatial multiplexing.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
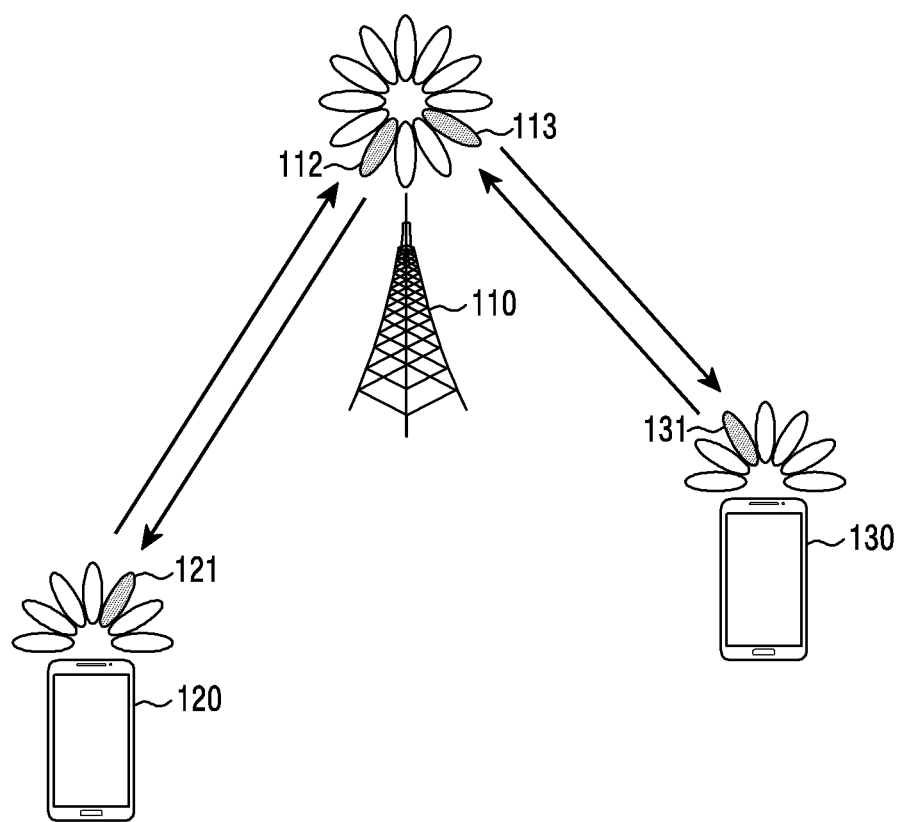
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus and method for obtaining channel information for supporting multiple-input multiple-output (MIMO) in a wireless communication system. Specifically, the disclosure describes a technology for reconstructing downlink MIMO CSI using channel state information (CSI)-reference signal (RS) and sounding RS (SRS) while reducing downlink training overhead by considering an antenna sub-array when obtaining channel information in a wireless communication system.

Terms referring to signals used in the following description, channels, control information, network entities, device components, etc. are exemplified for convenience of explanation. Accordingly, the disclosure is not limited to the terms described below, and other terms having equivalent technical meanings may be used.

In the following description, a physical channel and a signal may be used interchangeably with data or a control signal. For example, the physical downlink shared channel (PDSCH) is a term referring to a physical channel through which data is transmitted, but the PDSCH may also be used to refer to data. That is, in the disclosure, the expression 'transmitting a physical channel' may be interpreted equally to the expression 'transmitting data or signals through a physical channel'.

Hereinafter, in the disclosure, upper signaling refers to a signal transmission method transmitted from a base station to a terminal using a downlink data channel of a physical layer or from a terminal to a base station using an uplink data channel of a physical layer. The upper signaling may be understood as radio resource control (RRC) signaling or media access control (MAC) control element (CE).

In addition, in the disclosure, in order to determine whether a specific condition is satisfied or fulfilled, an expression of more than or less than is used, but this is only a description to express an example and does not exclude a description of not less than or not more than. Conditions described as 'not less than' may be replaced with 'more than', conditions described as 'not more than' may be replaced with 'less than', and conditions described as ' not less than and not more than' may be replaced with 'more than and less than'.

In addition, the disclosure describes various embodiments using terms used in some communication standards (e.g., 3rd generation partnership project (3GPP)), but this is only an example for description. Various embodiments of the disclosure may be easily modified and applied in other communication systems.

FIG. 1 illustrates a wireless communication system according to an embodiment of the disclosure. FIG. 1 illustrates a base station 110, a terminal 120, and a terminal 130 as part of nodes using a wireless channel in a wireless communication system. FIG. 1 illustrates only one base station, but may further include another base station that is the same as or similar to the base station 110.

Referring to FIG. 1, the base station 110 is a network infrastructure that provides wireless access to terminals 120 and 130. The base station 110 has coverage defined as a predetermined geographic area based on a distance capable of transmitting a signal. In addition to the base station, the base station 110 may be referred to as an 'access point (AP)', an 'eNodeB (eNB)', '5th generation node (5G node), 'next generation nodeB (gNB), 'wireless point', 'transmission/reception point (TRP)', or other terms having a technical meaning equivalent thereto.

Each of the terminal 120 and the terminal 130 is a device used by a user, and performs communication with the base station 110 through a wireless channel. In some cases, at least one of the terminal 120 and the terminal 130 may be operated without the user's involvement. That is, at least one of the terminal 120 and the terminal 130 is a device that performs machine type communication (MTC) and may not be carried by a user. Each of the terminal 120 and the terminal 130 may be referred to as 'user equipment (UE)', 'mobile station', 'subscriber station', 'remote terminal', 'wireless terminal', 'user device', or other terms having an equivalent technical meaning thereto in addition to terminal.

The base station 110, the terminal 120, and the terminal 130 may transmit and receive wireless signals in millimeter wave (mmWave) bands (e.g., 28 GHz, 30 GHz, 38 GHz, and 60 GHz). In this case, in order to improve the channel gain, the base station 110, the terminal 120, and the terminal 130 may perform beamforming. Here, the beamforming may include transmission beamforming and reception beamforming. That is, the base station 110, the terminal 120, and the terminal 130 may assign directivity to a transmission signal or a reception signal. To this end, the base station 110 and the terminals 120 and 130 may select serving beams 112, 113, 121, and 131 through a beam search or beam management procedure. After the serving beams 112, 113, 121, and 131 are selected, subsequent communication may be performed through a resource having a quasi co-located (QCL) relationship with the resource transmitting the serving beams 112, 113, 121, and 131.

If large-scale characteristics of the channel delivering the symbol on the first antenna port can be inferred from the channel delivering the symbol on the second antenna port, the first antenna port and the second antenna port may be evaluated to be in a QCL relationship. For example, the large-scale characteristics may include at least one of delay spread, Doppler spread, Doppler shift, average gain, average delay, and a spatial receiver parameter.

Figure 2:
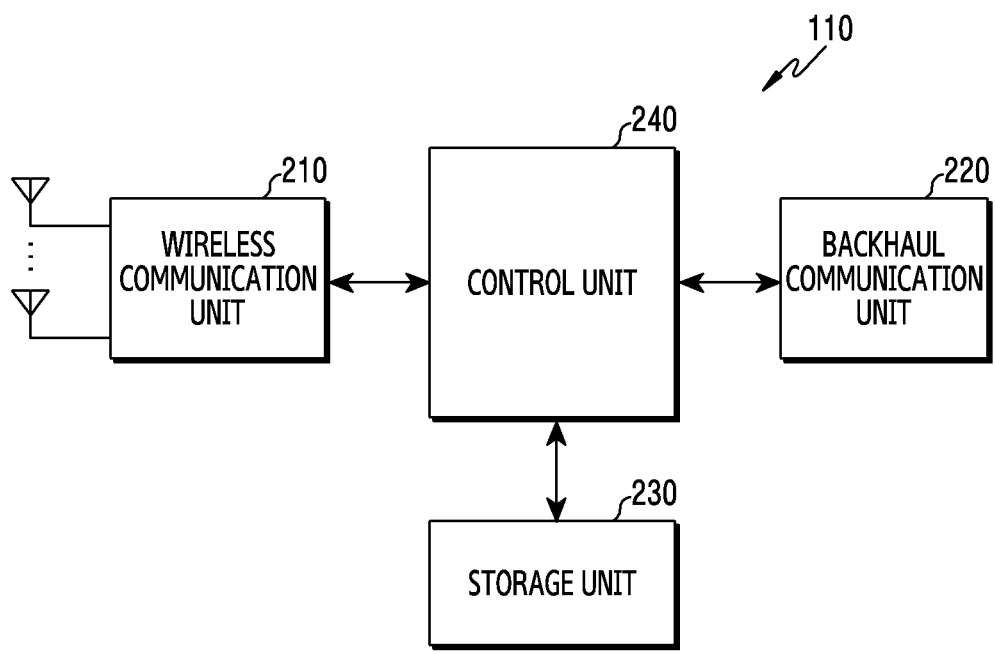
FIG. 2 illustrates a configuration of a base station in a wireless communication system according to an embodiment of the disclosure.

FIG. 2 illustrates a configuration of a base station in a wireless communication system according to an embodiment of the disclosure. The configuration illustrated in FIG. 2 may be understood as a configuration of the base station 110. Terms such as " . . . unit" and "-er" used below refer to units that process at least one function or operation, and may be implemented by hardware, software, or a combination of hardware and software.

Referring to FIG. 2, the base station includes a wireless communication unit 210, a backhaul communication unit 220, a storage unit 230, and a control unit 240.

The wireless communication unit 210 may perform functions for transmitting and receiving signals through a wireless channel. For example, the wireless communication unit 210 may perform a conversion function between a baseband signal and a bit string according to a physical layer standard of a system. For example, when transmitting data, the wireless communication unit 210 generates complex symbols by encoding and modulating a transmission bit string. In addition, when receiving data, the wireless communication unit 210 reconstructs the received bit string through demodulation and decoding of the baseband signal.

In addition, the wireless communication unit 210 up-converts the baseband signal into a radio frequency (RF) band signal and transmits the RF band signal through an antenna, and down-converts the RF band signal received through the antenna into a baseband signal. To this end, the wireless communication unit 210 may include a transmission filter, a reception filter, an amplifier, a mixer, an oscillator, a digital to analog convertor (DAC), an analog to digital convertor (ADC), and the like. In addition, the wireless communication unit 210 may include a plurality of transmission/reception paths. Furthermore, the wireless communication unit 210 may include at least one antenna array composed of a plurality of antenna elements.

In terms of hardware, the wireless communication unit 210 may be composed of a digital unit and an analog unit, and the analog unit may be composed of a plurality of sub-units according to operating power, operating frequency, and the like. The digital unit may be implemented as at least one processor (e.g., a digital signal processor (DSP)).

The wireless communication unit 210 transmits and receives signals as described above. Accordingly, all or part of the wireless communication unit 210 may be referred to as a 'transmitter', 'receiver', or 'transceiver'. In addition, in the following description, transmission and reception performed through a wireless channel are used as a meaning including performing the above-described processing by the wireless communication unit 210.

The backhaul communication unit 220 provides an interface for performing communication with other nodes in the network. That is, the backhaul communication unit 220 converts a bit string transmitted from a base station to another node, for example, another access node, another base station, an upper node, and a core network, etc. to a physical signal, and converts a physical signal received from another node into a bit string.

The storage unit 230 stores data such as a basic program, an application program, and configuration information for the operation of the base station. The storage unit 230 may be configured as a volatile memory, a nonvolatile memory, or a combination of a volatile memory and a nonvolatile memory. In addition, the storage unit 230 provides stored data according to a request by the control unit 240.

The control unit 240 controls overall operations of the base station. For example, the control unit 240 transmits and receives signals through the wireless communication unit 210 or the backhaul communication unit 220. In addition, the control unit 240 writes and reads data in the storage unit 230. In addition, the control unit 240 may perform functions of a protocol stack required by the communication standard. According to another embodiment, the protocol stack may be included in the wireless communication unit 210. To this end, the control unit 240 may include at least one processor. According to various embodiments, the control unit 240 may control the base station to perform operations according to various embodiments to be described later.

Figure 3:
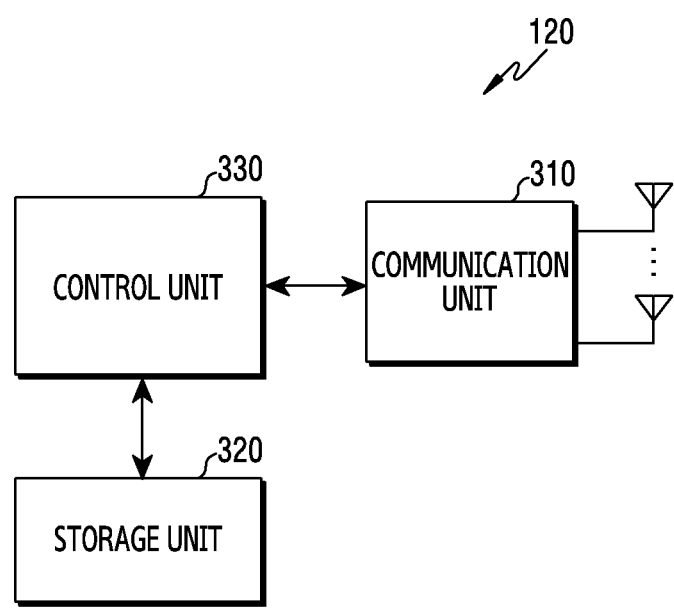
FIG. 3 illustrates a configuration of a terminal in a wireless communication system according to an embodiment of the disclosure.

FIG. 3 illustrates a configuration of a terminal in a wireless communication system according to an embodiment of the disclosure. The configuration illustrated in FIG. 3 may be understood as a configuration of the terminal 120. Terms such as " . . . unit" and "-er" used below refer to units that process at least one function or operation, and may be implemented by hardware, software, or a combination of hardware and software.

Referring to FIG. 3, the terminal includes a communication unit 310, a storage unit 320, and a control unit 330.

The communication unit 310 may perform functions for transmitting and receiving signals through a wireless channel. For example, the communication unit 310 may perform a conversion function between a baseband signal and a bit string according to a physical layer standard of a system. For example, when transmitting data, the communication unit 310 generates complex symbols by encoding and modulating a transmission bit string. In addition, when receiving data, the communication unit 310 reconstructs the received bit string through demodulation and decoding of the baseband signal. In addition, the communication unit 310 up-converts the baseband signal into an RF band signal and transmits the RF band signal through an antenna, and down-converts the RF band signal received through the antenna into a baseband signal. For example, the communication unit 310 may include a transmission filter, a reception filter, an amplifier, a mixer, an oscillator, a DAC, an ADC, and the like.

In addition, the communication unit 310 may include a plurality of transmission/reception paths. Furthermore, the communication unit 310 may include at least one antenna array composed of a plurality of antenna elements. In terms of hardware, the communication unit 310 may be composed of a digital circuit and an analog circuit (e.g., radio frequency integrated circuit (RFIC)). Here, the digital circuit and the analog circuit may be implemented as a single package. In addition, the communication unit 310 may include a plurality of RF chains. Furthermore, the communication unit 310 may perform beamforming.

The communication unit 310 transmits and receives signals as described above. Accordingly, all or part of the communication unit 310 may be referred to as a 'transmitter', 'receiver', or 'transceiver'. In addition, in the following description, transmission and reception performed through a wireless channel are used as a meaning including performing the above-described processing by the communication unit 310.

The storage unit 320 stores data such as a basic program, an application program, and configuration information for the operation of the terminal. The storage unit 320 may be configured as a volatile memory, a nonvolatile memory, or a combination of a volatile memory and a nonvolatile memory. In addition, the storage unit 320 provides stored data according to a request from the control unit 330.

The control unit 330 controls overall operations of the terminal. For example, the control unit 330 transmits and receives signals through the communication unit 310. In addition, the control unit 330 writes and reads data in the storage unit 320. In addition, the control unit 330 may perform functions of a protocol stack required by the communication standard. To this end, the control unit 330 may include at least one processor or a micro-processor, or may be a part of the processor. In addition, a part of the communication unit 310 and the control unit 330 may be referred to as a communication processor (CP). According to various embodiments, the control unit 330 may control a terminal to perform operations according to various embodiments to be described later.

Figure 4:
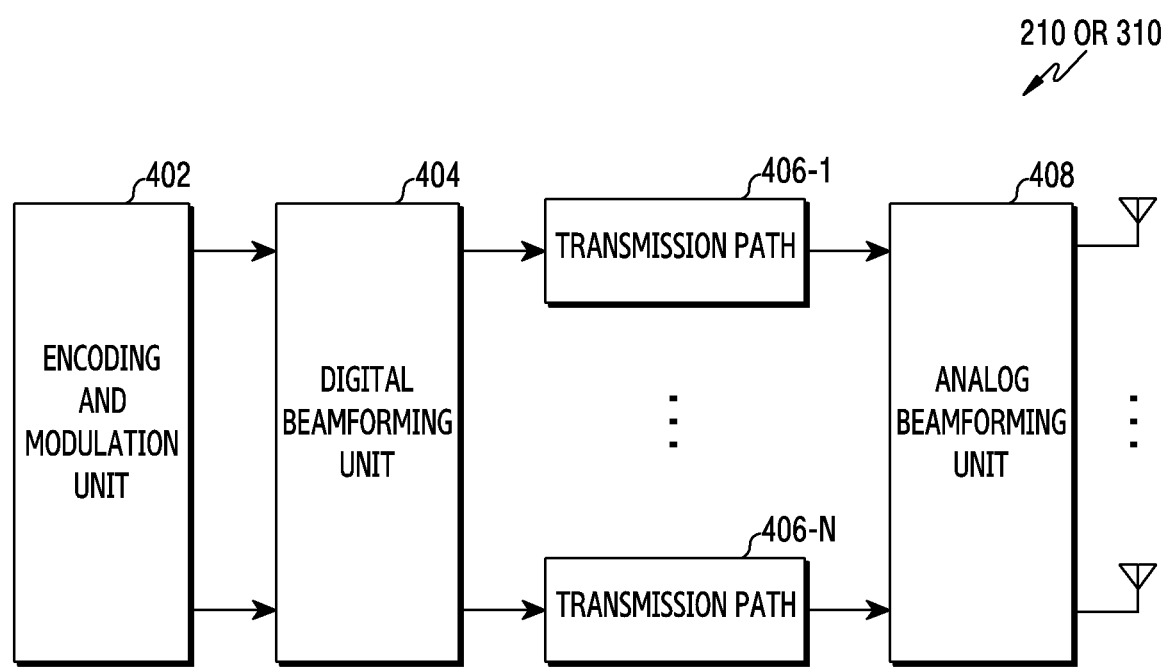
FIG. 4 illustrates a configuration of a communication unit in a wireless communication system according to an embodiment of the disclosure.

FIG. 4 illustrates a configuration of a communication unit in a wireless communication system according to an embodiment of the disclosure. FIG. 4 illustrates an example of a detailed configuration of the wireless communication unit 210 of FIG. 2 or the communication unit 310 of FIG. 3. Specifically, FIG. 4 illustrates components for performing beamforming as a part of the wireless communication unit 210 of FIG. 2 or the communication unit 310 of FIG. 3.

Referring to FIG. 4, the wireless communication unit 210 or the communication unit 310 includes an encoding and modulation unit 402, a digital beamforming unit 404, a plurality of transmission paths 406-1 to 406-N, and an analog beamforming unit 408.

The encoding and modulation unit 402 performs channel encoding. For channel encoding, at least one of a low density parity check (LDPC) code, a convolution code, and a polar code may be used. The encoding and modulation unit 402 generates modulation symbols by performing constellation mapping.

The digital beamforming unit 404 performs beamforming on a digital signal (e.g., modulation symbols). To this end, the digital beamforming unit 404 multiplies the modulation symbols by beamforming weights. Here, the beamforming weights are used to change the magnitude and phase of a signal, and may be referred to as a precoding matrix, a pre-coder, or the like. The digital beamforming unit 404 outputs the digital beamformed modulation symbols to the plurality of transmission paths 406-1 to 406-N. In this case, according to a multiple input multiple output (MIMO) transmission scheme, modulation symbols may be multiplexed or the same modulation symbols may be provided to a plurality of transmission paths 406-1 to 406-N.

A plurality of transmission paths 406-1 to 406-N convert the digital beamformed digital signals into analog signals. To this end, each of the plurality of transmission paths 406-1 to 406-N may include an inverse fast Fourier transform (IFFT) operation unit, a cyclic prefix (CP) insertion unit, a DAC, and an up-conversion unit. The CP insertion unit is for an orthogonal frequency division multiplexing (OFDM) scheme, and may be excluded when another physical layer scheme (e.g., filter bank multi-carrier (FBMC)) is applied. That is, the plurality of transmission paths 406-1 to 406-N provide independent signal processing processes for a plurality of streams generated through digital beamforming. However, depending on the implementation method, some of the components of the plurality of transmission paths 406-1 to 406-N may be used in common.

The analog beamforming unit 408 performs beamforming on an analog signal. To this end, the analog beamforming unit 408 multiplies the analog signals by beamforming weights. Here, the beamforming weights are used to change the magnitude and phase of a signal. Specifically, according to a plurality of transmission paths 406-1 to 406-N and a connection structure between antennas, the analog beamforming unit 408 may be variously configured. For example, each of a plurality of transmission paths 406-1 to 406-N may be connected to one antenna array. As another example, a plurality of transmission paths 406-1 to 406-N may be connected to one antenna array. As another example, a plurality of transmission paths 406-1 to 406-N may be adaptively connected to one antenna array or may be connected to two or more antenna arrays.

In order for the base station to obtain channel state information (CSI), in many studies considering a massive MIMO system, time division duplexing (TDD) is considered. In the case of TDD, there is an advantage in that CSI may be more easily obtained by using channel reciprocity between an uplink channel and a downlink channel.

However, even if TDD is used to support spatial multiplexing, CSI may need to be obtained through a downlink training process. In many cases, a situation in which the number of transmit antennas of the terminal is smaller than the number of receive antennas is considered because of power consumption problems and circuit design complexity problems. In this situation, even assuming channel reciprocity in TDD, because intact MIMO CSI may not be obtained only by uplink sounding reference signal (SRS) transmitted by the terminal, the base station obtains CSI through a downlink training operation through the downlink CSI-reference signal (RS) defined in the 3GPP standard.

In the downlink training operation through the CSI-RS, the use of antenna sub-arrays may be considered to reduce training overhead that may grow because of the large number of antennas in the base station. Considering the antenna sub-array, because the number of effective antenna ports becomes smaller than the number of antennas of the base station, there may be an advantage in that training overhead is reduced, but there may also be a disadvantage in that an intact MIMO CSI may not be obtained through CSI-RS.

Various embodiments of the disclosure consider a massive MIMO system in a TDD situation. In the following description, it is assumed that the base station transmits and receives signals through a total of $N_{BS}$ antennas, the terminal transmits signals through a total of $M_{UE}$ antennas, and transmits signals through one of the $M_{UE}$ antennas. In this case, an index (e.g., a transit antenna index) of an antenna used for transmission in the terminal is $m_{TX}$. In addition, an antenna sub-array may be considered to alleviate downlink training overhead in the base station. In this case, when J antennas configure one sub-array, a total of $K=N_{BS}/J$ antenna ports are configured.

Figure 5:
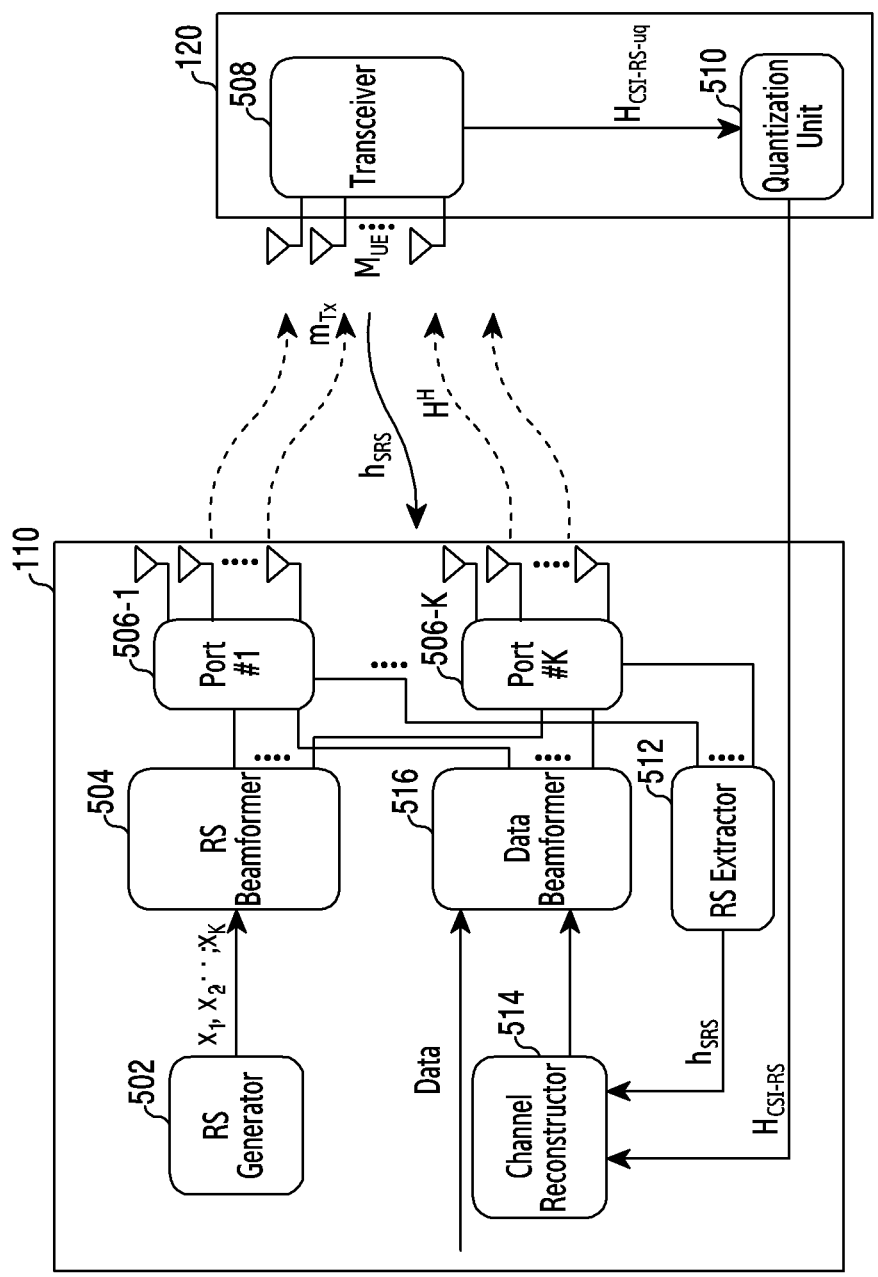
FIG. 5 illustrates a functional configuration for interaction between a base station and a terminal in a wireless communication system according to an embodiment of the disclosure.

FIG. 5 illustrates a functional configuration for interaction between a base station and a terminal in a wireless communication system according to an embodiment of the disclosure. FIG. 5 exemplifies functional components of the base station 110 and the terminal 120, and the components illustrated in FIG. 5 may be included in at least one of the components described with reference to FIG. 2 or 3.

Referring to FIG. 5, downlink RSs (e.g., CSI-RSs) are generated by the RS generator 502 in the base station 110. The downlink RS is beamformed by an RS beamformer 504, and then transmitted through K antenna ports 506-1 to 506-K configured from $N_{BS}$ antennas. Downlink RSs transmitted through the K antenna ports 506-1 to 506-K are received by antennas (e.g., $M_{UE}$ antennas) of the terminal 120 through channels.

Based on the downlink RSs received by the antennas of the terminal 120, the transceiver 508 infers channel information (e.g., $h_{CSI-RS-uq}$) between the antenna ports 506-1 to 506-K of the base station 110 and the antennas of the terminal 120, and the inferred channel information is quantized by the quantization unit 510. The quantized channel information (e.g., $H_{CSI-RS}$) is fed back to the base station 110. In addition, the transceiver 508 transmits an uplink RS (e.g., SRS) through one of the plurality of antennas. The base station 110 receives the uplink signals including uplink RS through the antenna ports 506-1 to 506-K. The RS extractor 512 extracts the uplink RS from the received uplink signals, and channel information (e.g., $h_{SRS}$) between one antenna of the terminal 120 and antenna ports 506-1 to 506-K of the base station 110 is inferred based on the uplink RS.

The channel reconstructor 514 of the base station 110 reconstructs more accurate channel information using the first channel information (e.g., $h_{SRS}$) inferred based on the uplink RS and the second channel information (e.g., $H_{CSI-RS}$) fed back from the terminal 120. The reconstructed channel information is more accurate than the first channel information or the second channel information. Specifically, because the first channel information is channel information for one of the antennas of the terminal 120, the reconstructed channel information may be more intact in terms of quantity. In addition, because the second channel information is quantized channel information, the reconstructed channel information may be more accurate in terms of quality. That is, the channel reconstructor 514 may reconstruct channel information of $N_{BS} \times M_{UE}$ size from the first channel information of $N_{BS} \times 1$ size and the second channel information of $K \times M_{UE}$ size. Thereafter, the data beamformer 516 of the base station 110 may perform beamforming on the data signal using the reconstructed channel information.

In the equations described below, lowercase and uppercase letters represent column vectors and matrices. $A^T$, $A^H$, and $A^+$ represent transpose, conjugate transpose, and pseudo-inverse of matrix A. $A(:,m:n)$ is a submatrix consisting of the mth column to the nth column of matrix A, and $A(m:n,:)$ is a submatrix consisting of the mth row to the nth row of the matrix A. $a(m:n)$ is a vector consisting of the mth to nth elements of vector a. $|\cdot|$ represents an absolute value of the complex number, $\|\cdot\|$ represents an $l'_2$ norm of the vector and $\|\cdot\|_F$ represents a Frobenius norm of the matrix. $0_m$ denotes an all zero vector of $m \times 1$, and $I_m$ denotes an identity matrix of $m \times m$.

Methods according to various embodiments described below are applicable to a base station operating a uniform linear array (ULA) or a uniform planar array (UPA).

Figure 6:
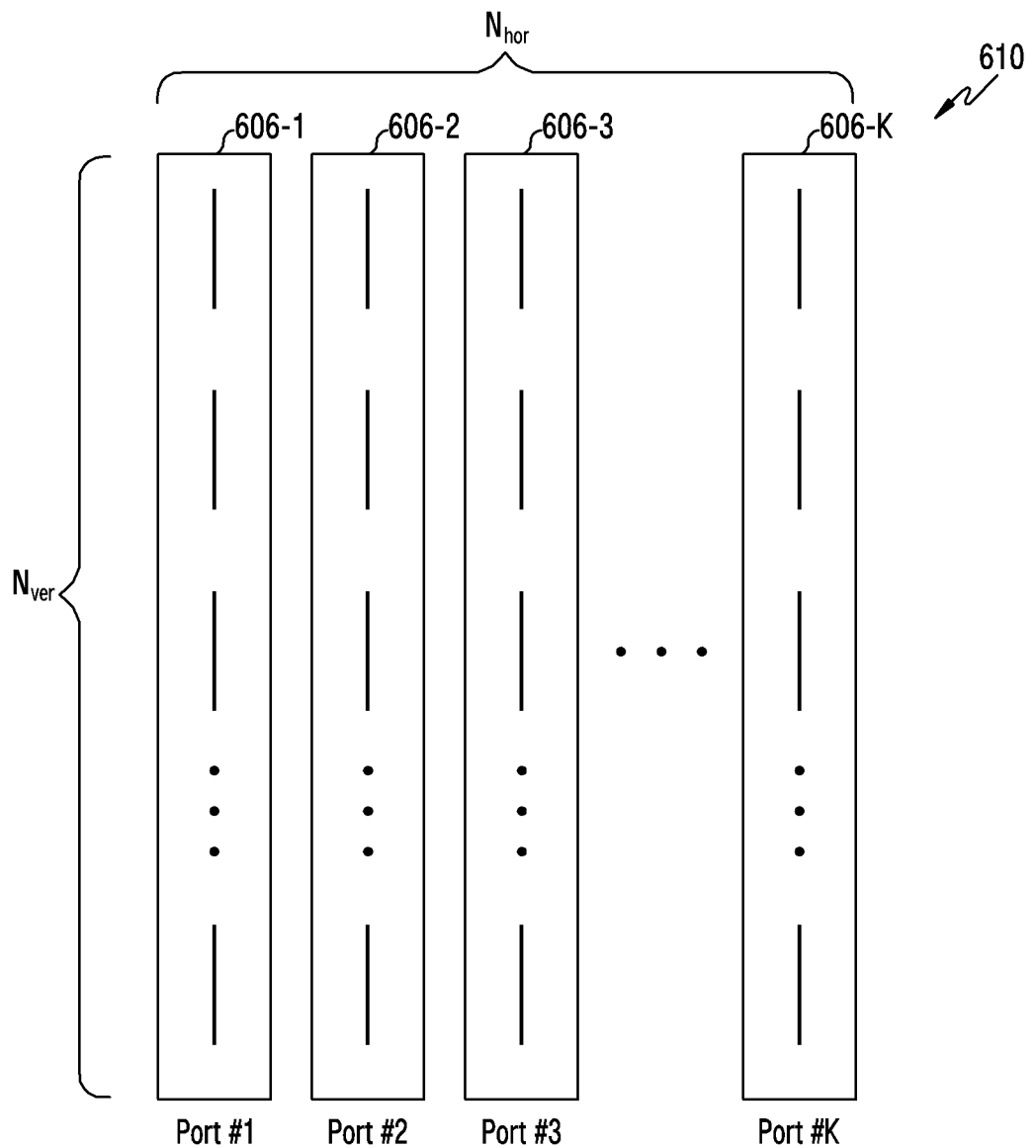
FIG. 6 illustrates an example of an antenna structure of a base station in a wireless communication system according to an embodiment of the disclosure.

FIG. 6 illustrates an example of an antenna structure of a base station in a wireless communication system according to an embodiment of the disclosure. FIG. 6 illustrates a UPA.

Referring to FIG. 6, the UPA 610 may include $N_{ver}=J$ antenna ports in a vertical direction and $N_{hor}=K$ antenna ports 606-1 to 606-K in a horizontal direction. In the following description, the number of antenna ports or antennas may be expressed as variables J and K if the base station operates the ULA, and variables Nver and Nhor if the UPA is operated.

Figure 7:
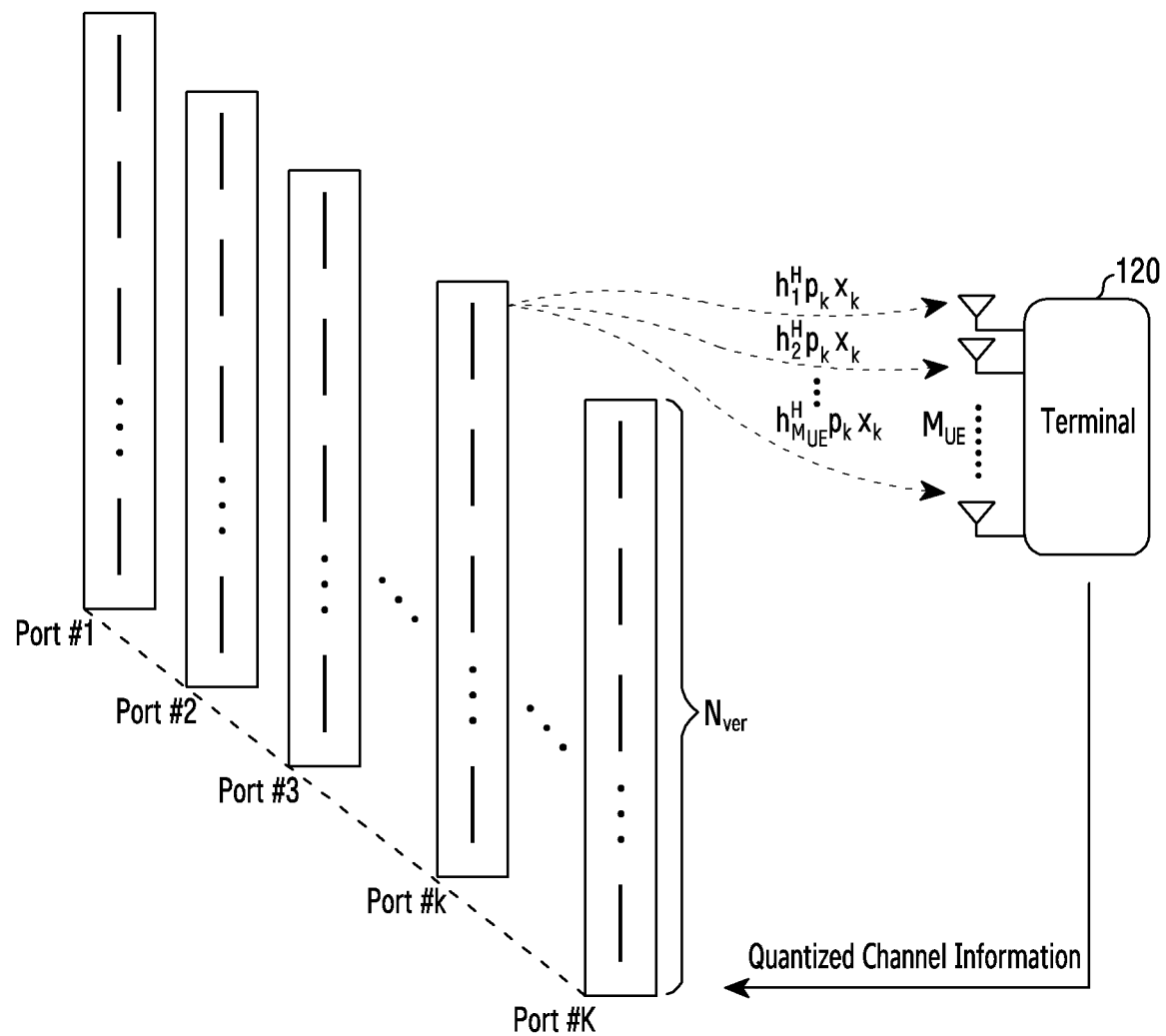
FIG. 7 illustrates an example of transmitting a reference signal (RS) from a base station to a terminal in a wireless communication system according to an embodiment of the disclosure.

When the antenna sub-arrays are configured, as illustrated in FIG. 7, the CSI-RS known to both the terminal and the base station is transmitted from the base station to the terminal through each antenna port.

FIG. 7 illustrates an example of transmitting a reference signal from a base station to a terminal in a wireless communication system according to an embodiment of the disclosure.

Referring to FIG. 7, the terminal 120 may receive K reference signals, quantize channel information inferred from the received reference signals, select one codeword from a precoding matrix indicator (PMI) codebook, and transmit index of the selected codeword to the base station. In this case, the reception signal $y_k$ in the terminal through the k-th ($k=1, 2, \ldots, K$) antenna port may be expressed as Equation 1 below when the noise is ignored.

$$y_k = H^H p_k x_k \quad \text{Equation 1}$$

In Equation 1, $y_k$ represents a received signal corresponding to a signal transmitted through the k-th antenna port, $H^H$ represents a channel between a base station and a terminal of $N_{BS} \times M_{UE}$ size, $p_k$ represents a beamforming vector corresponding to the k-th antenna port, and $x_k$ represents a signal transmitted through the k-th antenna port.

Because methods according to various embodiments are not affected by CSI-RS, it is assumed that $x_k=1$. In addition, $p_k$ may be defined as Equation 2 below.

$$p_k = [0_{(k-1)J}{}^T, w_k{}^T, 0_{N_{BS}-kJ}{}^T]^T \quad \text{Equation 2}$$

In Equation 2, $p_k$ represents a beamforming vector corresponding to the k-th antenna port, and $w_k$ represents a beamforming weight vector applied to the k-th antenna sub-array.

The terminal configures an unquantized effective CSI-RS channel matrix $H_{CSI-RS-uq}$ based on K reception signals. The unquantized effective channel matrix may be expressed as Equation 3.

$$H_{CSI-RS-uq} = [y_1, y_2, \ldots, y_K]$$
$$= H^H P$$

Equation 3

In Equation 3, $H_{CSI-RS-uq}$ represents an unquantized effective channel matrix, yk represents a k-th column of the effective channel matrix, $H^H$ represents a downlink channel, and P represents a precoding matrix. Here, P=[p1, p2, ... pk].

Let the terminal quantize $H_{CSI-RS-uq}$ through the PMI codebook for layer L as $H^H_{CSI-RS}$. Here, the reason for taking Hermitian to the $H_{CSI-RS}$ is that the original purpose of the PMI codebook is to inform the base station of the beamformer for data transmission through the codeword, so the base station must take Hermitian to consider the fed-back PMI codeword $H_{CSI-RS}$ as a channel. In this case, $H_{CSI-RS-uq}$ is a matrix of $M_{UE} \times K$ size, and $H^H_{CSI-RS}$ is a matrix of $L \times K$ size. The base station may recognize $L_{max}$, which is the maximum number of feedback layers of the terminal, rather than the number of antennas $M_{UE}$ in the terminal, and L is less than or equal to $L_{max}$.

In this case, if L is less than $L_{max}$, the base station may replace $H_{CSI-RS}$ with one of the codewords of $K \times L_{max}$ size for the layer $L_{max}$ based on the fed-back $H_{CSI-RS}$. For example, the base station may select a layer $L_{max}$ codeword having the same first column vector as the first column vector of the fed-back $H_{CSI-RS}$ in consideration of the structure of the PMI codebook and utilize the selected layer $L_{max}$ codeword to reconstruct a downlink channel of $N_{BS} \times L_{max}$ size. In this case, if the $L_{max}$ and the $M_{UE}$ have the same value, the intact downlink MIMO channel may be reconstructed, and if not, the downlink channel of the maximum $N_{BS} \times L_{max}$ size may be reconstructed.

Alternatively, the base station may reconstruct the $N_{BS} \times L$ channel for layer L transmission by using the $H_{CSI-RS}$ of $K \times L$ size. In this case, because the downlink channel reconstruction methods according to embodiments to be described below are methods developed on the assumption that L and $L_{max}$ have the same value, channels of $N_{BS} \times L$ size may be reconstructed by replacing $L_{max}$ with L in the equations described below, and the results may be verified.

In the TDD, the base station may infer the downlink channel from the uplink SRS transmitted from the terminal by utilizing the channel reciprocity between the downlink and the uplink. In this case, because the terminal has only one transmit antenna, the base station may infer a vector $h^H_{SRS}$ of $1 \times N_{BS}$ size corresponding to one of the rows of $H^H$ without considering noise. Hereinafter, various embodiments of reconstructing an intact downlink channel through $H_{CSI-RS}$ and $h_{SRS}$ under the assumption that L and $L_{max}$ have the same value will be described in the disclosure.

Figure 8:
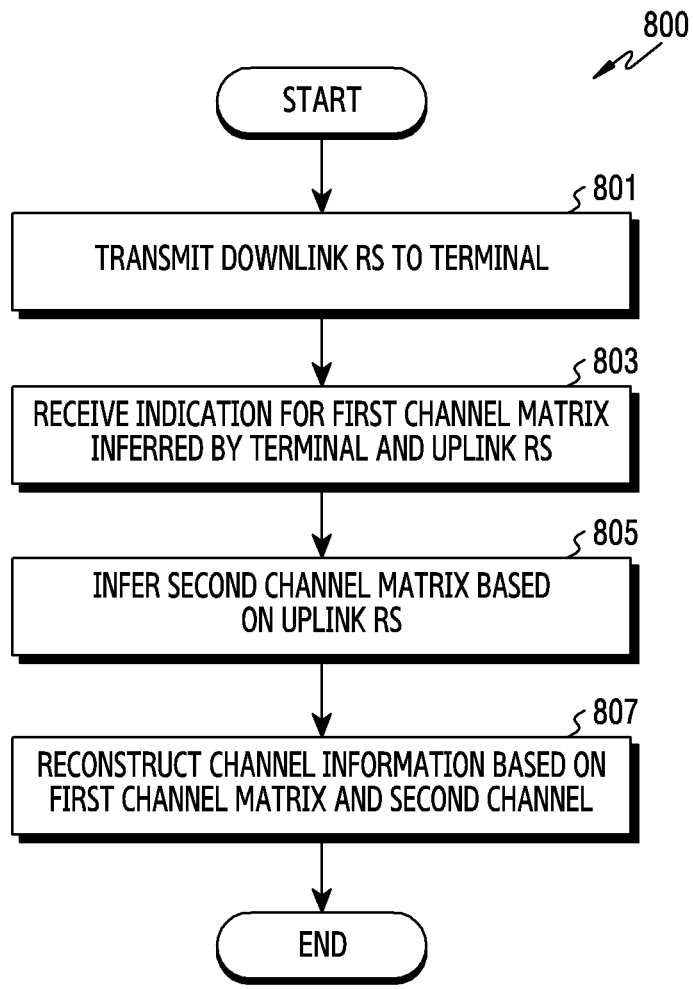
FIG. 8 illustrates a flowchart for obtaining channel information in a wireless communication system according to an embodiment of the disclosure.

FIG. 8 illustrates a flowchart 800 for obtaining channel information in a wireless communication system according to an embodiment of the disclosure. FIG. 8 illustrates an operating method of the base station 110.

Referring to FIG. 8, in operation 801, the base station transmits downlink RSs to the terminal. The base station transmits downlink RSs through a plurality of antenna ports. Here, one antenna port may correspond to one antenna sub-array. Additionally, the base station may perform precoding, that is, beamforming, on downlink RSs.

In operation 803, the base station receives an indication for the first channel matrix inferred by the terminal and at least one uplink RS. Here, the first channel matrix is a quantized result of the channel matrix inferred by the terminal based on the downlink RSs, and represents quantized channel information between the antenna ports of the base station and the antennas of the terminal. The indication for the first channel matrix may include at least one value indicating one codeword in the codebook. In addition, at least one uplink RS is transmitted through one of the antennas used to receive the downlink RSs in the terminal.

In operation 805, the base station infers a second channel matrix based on at least one uplink RS. The second channel matrix indicates channel information between one antenna used for transmitting at least one uplink RS and antenna ports of the base station.

In operation 807, the base station reconstructs channel information to be used for data transmission based on the first channel matrix and the second channel matrix. In other words, the base station reconstructs channel information between the antenna ports of the base station and the antennas of the terminal based on the quantized channel information fed back from the terminal and the partial channel information inferred by the base station. According to various embodiments, the base station may reconstruct channel information based on a ratio of channel values corresponding to the antennas of the terminal or based on angle of arrival (AoA) and angle of departure (AoD) of the channel.

Figure 9:
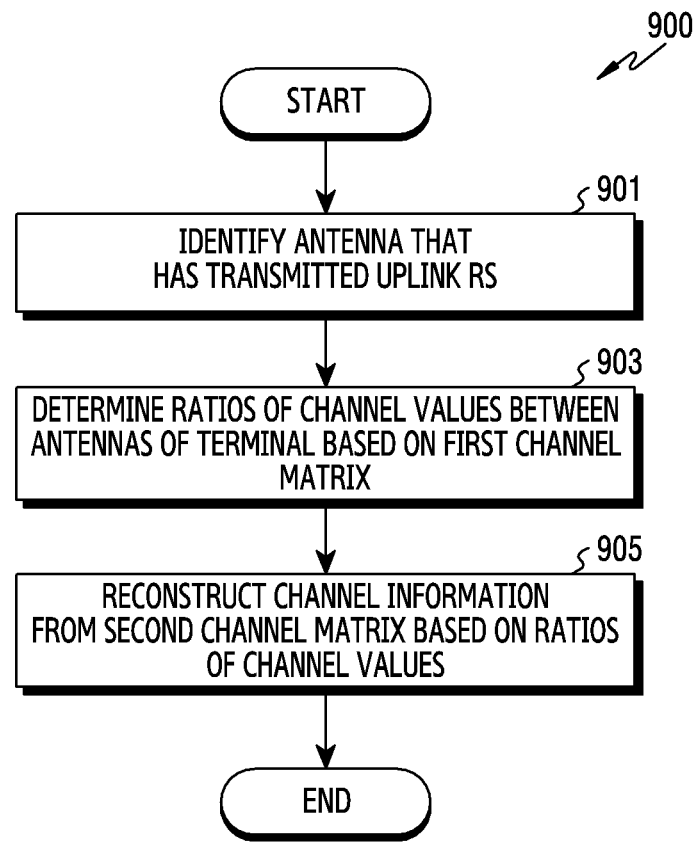
FIG. 9 illustrates a flowchart for reconstructing channel information using a ratio between channel sizes in a wireless communication system according to an embodiment of the disclosure.

FIG. 9 illustrates a flowchart for reconstructing channel information using a ratio between channel sizes in a wireless communication system according to an embodiment of the disclosure. FIG. 9 illustrates an operating method of the base station 110.

In operation 901, the base station identifies an antenna that has transmitted at least one uplink RS. According to an embodiment, the antenna that has transmitted at least one uplink RS may be identified based on a second channel matrix inferred using at least one uplink RS. According to another embodiment, the antenna that has transmitted at least one uplink RS may be treated as a predefined antenna.

In operation 903, the base station determines ratios of channel values between antennas of the terminal based on the first channel matrix. In other words, the base station may determine ratios of channel sizes between antennas of the terminal based on the quantized channel information. For example, the base station may determine a ratio of channel sizes between the first antenna of the terminal and the second antenna of the terminal. In this case, the ratios may include relative sizes of the remaining antennas with respect to the antenna identified as having transmitted the uplink RS.

In operation 905, the base station reconstructs channel information from the second channel matrix based on the ratios of the channel values. The base station may determine columns or rows of channel information corresponding to other antennas from the second channel matrix based on the ratio values. Accordingly, the base station may reconstruct channel information between the antenna ports of the base station and the antennas of the terminal.

As described with reference to FIG. 9, the base station may reconstruct channel information based on ratios of channel values between the antennas of the terminal. More specifically, a process of reconstructing channel information based on ratios of channel values will be described with reference to the following equations. In the following description, a method for reconstructing channel information based on ratios of channel values may be referred to as a 'ratio method'.

When the downlink channel is expressed as $H=[h_1, h_2, \ldots, h_{M_{UE}}]$, $H_{CSI-RS-uq}$ of Equation 3 may be expressed as Equation 4 below.

$$H_{CSI-RS-uq} = \begin{bmatrix} h_1^H p_1 & h_1^H p_2 & \cdots & h_1^H p_K \\ h_2^H p_1 & h_2^H p_2 & & h_2^H p_K \\ \vdots & \vdots & \ddots & \vdots \\ h_{M_{UE}}^H p_1 & h_{M_{UE}}^H p_2 & \cdots & h_{M_{UE}}^H p_K \end{bmatrix} \quad \text{Equation 4}$$

In Equation 4, $H_{CSI-RS-uq}$ represents an unquantized effective channel matrix, $h_m$ represents a channel vector between the base station and the m-th antenna of the terminal, $p_k$ represents a beamforming vector corresponding to the k-th antenna port, and $M_{UE}$ represents the number of antennas of the terminal.

Referring to Equation 4, the (m,k)-th component of the $H_{CSI-RS-uq}$ matrix corresponds to the dot product between $h_m$ and $p_k$, and it is confirmed that the difference between the components of the k-th column in the $H_{CSI-RS-uq}$ matrix is $h_m$ that is the dot product with $p_k$. Accordingly, the base station may reconstruct the downlink channel from the $h_{SRS}$ at a ratio of the components of the $H_{CSI-RS}$. The m-th column of the downlink channel reconstructed by the above-described ratio method may be expressed as Equation 5 below.

$$\hat{h}_{m,ratio} = \left[ h_{SRS}^T(1:J) \frac{H_{CSI-RS}^H(m,1)}{H_{CSI-RS}^H(m_{Tx},1)}, \right.$$

$$h_{SRS}^T(J+1:2J) \frac{H_{CSI-RS}^H(m,2)}{H_{CSI-RS}^H(m_{Tx},2)}, \ldots,$$

$$\left. h_{SRS}^T((K-1)J+1:KJ) \frac{H_{CSI-RS}^H(m,K)}{H_{CSI-RS}^H(m_{Tx},K)} \right]^T$$

Equation 5

In Equation 5, $\hat{h}_{m,ratio}$ represents an m-th column of the downlink channel reconstructed by the ratio method, $h_{SRS}$ represents a channel matrix inferred based on the uplink reference signal, and $H_{CSI-RS}$ represents a quantized channel matrix fed back from a terminal.

Figure 10:
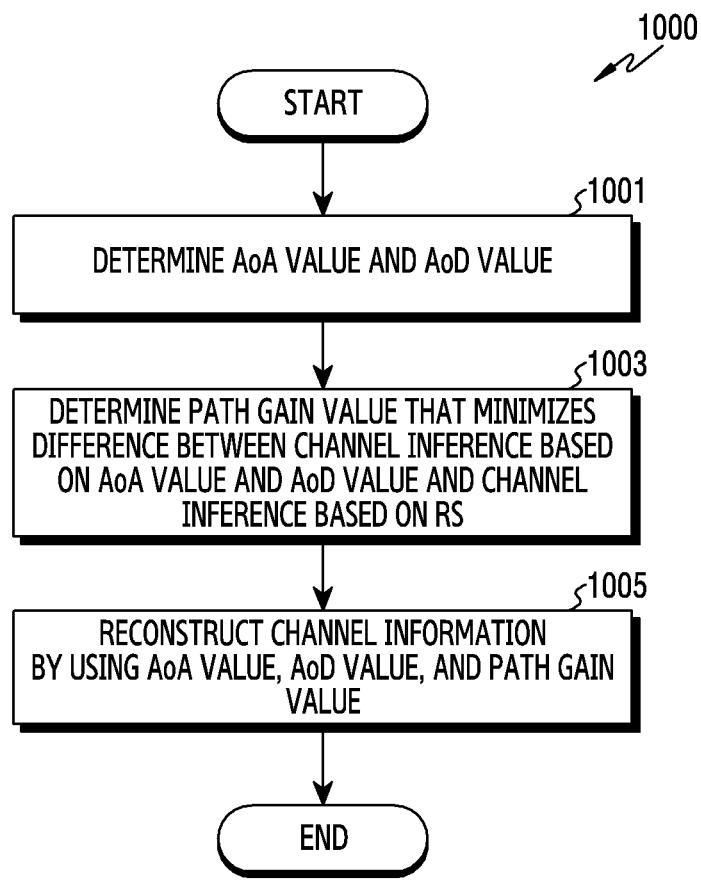
FIG. 10 illustrates a flowchart for reconstructing channel information using angle of arrival (AoA) and angle of departure (AoD) in a wireless communication system according to an embodiment of the disclosure.

FIG. 10 illustrates a flowchart 1000 for reconstructing channel information using angle of arrival (AoA) and angle of departure (AoD) in a wireless communication system according to an embodiment of the disclosure. FIG. 10 illustrates an operating method of the base station 110.

In operation 1001, the base station determines an AoA value and an AoD value. According to an embodiment, the base station may determine at least one dominant AoA and at least one dominant AoD, and determine the AoA value and the AoD value based on the determined at least one dominant AoA and the at least one dominant AoD. For example, the AoA value may be a vector including at least one dominant AoA, and the AoD value may be a vector including at least one dominant AoD.

In operation 1003, the base station determines a path gain value that minimizes the difference between the channel inference based on the AoA value and the AoD value and the channel inference based on the RS. When the AoA value and the AoD value are determined, the channel matrix may be inferred by multiplying the AoA value and the AoD value by the path gain. Because the base station recognizes the channel matrices inferred based on RS (e.g., quantized first channel matrix and inferred second channel matrix based on uplink RS), the base station may determine a path gain value in which an error between channel matrices inferred based on the RS and channel matrices calculated based on the AoA value and the AoD value is minimized.

In operation 1005, the base station reconstructs channel information by using the AoA value, the AoD value, and the path gain value. According to an embodiment, the base station may reconstruct channel information by obtaining a channel matrix based on the AoA value and the AoD value by multiplying the AoA value, the AoD value, and the path gain value. According to another embodiment, channel information may be reconstructed by replacing a column corresponding to an antenna of a terminal that has transmitted an uplink RS in a channel matrix obtained based on the AoA value and the AoD value with the second channel matrix.

As described with reference to FIG. 10, the base station may reconstruct channel information based on the AoA value and the AoD value. More specifically, the process of reconstructing channel information based on the AoA value and the AoD value will be described with reference to the following equations. In the following description, a method for reconstructing channel information based on the AoA value and the AoD value may be referred to as a 'pre-search method'.

In a massive MIMO system, the downlink channel H may be generally expressed as a weighted sum of the cross product of array response vectors corresponding to AoA in the terminal and array response vectors corresponding to AoD in the base station. When the base station and the terminal use a uniform linear array (ULA), the downlink channel may be expressed as Equation 6 below.

$$\hat{H}_{pre} = \Sigma_{u=1}^{T_{AoA}} \Sigma_{v=1}^{T_{AoD}} c_{u,v} a_{AoA}(\hat{\psi}_u) a_{AoD}(\hat{\mu}_v)^H \quad \text{(Equation 6)}$$

In Equation 6, $\hat{H}_{pre}$ represents the downlink channel modeled for the pre-search method, $T_{AoA}$ represents the number of dominant AoAs, $T_{AoD}$ represents the number of dominant AoDs, u represents the index of AoA, v represents the index of AoD, $\hat{\psi}_u$ represents the u-th AoA, $\hat{\mu}_v$ represents the v-th AoD, $c_{u,v}$ represents the complex path gain of the path composed of AoA$\hat{\psi}_u$ and AoD$\hat{\mu}_v$, $a_{AoA}(\hat{\psi}_u)$ represents the array response vector in the terminal corresponding to AoA($\hat{\psi}_u$), and $a_{AoD}(\hat{\mu}_v)$ represents the array response vector in the base station corresponding to AoD($\hat{\mu}_v$). $a_{AoA}(\hat{\psi}_u)$ and $a_{AoD}(\hat{\mu}_v)$ may be expressed as Equation 7 and Equation 8 below.

$$a_{AoA}(\hat{\psi}_u) = \frac{1}{\sqrt{L_{max}}} \left[1, e^{i\pi sin(\hat{\psi}_u)}, \ldots, e^{i\pi(L_{max}-1)sin(\hat{\psi}_u)}\right]^T \quad \text{Equation 7}$$

In Equation 7, $a_{AoA}(\hat{\psi}_u)$ represents an array response vector in the terminal, $L_{max}$ represents the maximum number of layers supported by the terminal, and $\hat{\psi}_u$ represents the u-th AoA.

$$a_{AoD}(\hat{\mu}_v) = \frac{1}{\sqrt{N_{BS}}} \left[1, e^{i\pi sin(\hat{\mu}_v)}, \ldots, e^{i\pi(N_{BS}-1)sin(\hat{\mu}_v)}\right]^T \quad \text{Equation 8}$$

In Equation 8, $a_{AoD}(\hat{\mu}_v)$ represents an array response vector in the base station, $N_{BS}$ represents the number antennas of the base station, and $\hat{\mu}_v$ represents the v-th AoD.

When the base station operates a uniform planar array (UPA), the array response vector of Equation 8 may be expressed as Equation 9 below.

$$a_{AoD}(\hat{\mu}_{v,ver}, \hat{\mu}_{v,hor}) = \frac{1}{\sqrt{N_{BS}}}\left[1, e^{j\pi\sin(\hat{\mu}_{v,ver})}, \ldots, e^{j\pi(N_{ver}-1)\sin(\hat{\mu}_{v,ver})}\right]^T \otimes \left[1, e^{j\pi\sin(\hat{\mu}_{v,hor})}, e^{j\pi(N_{hor}-1)\sin(\hat{\mu}_{v,hor})}\right]^T \quad \text{Equation 9}$$

In Equation 9, $a_{AoD}(\hat{\mu}_{v,ver}, \hat{\mu}_{v,hor})$ represents an array response vector in the base station, $N_{BS}$ represents the number antennas of the base station, $\hat{\mu}_{v,ver}$ represents the v-th vertical AoD, $\hat{\mu}_{v,hor}$ represents the v-th horizontal AoD, and $\otimes$ represents the Kronecker product operator. Here, $N_{BS}=N_{ver}N_{hor}$ is satisfied.

According to the pre-search method, the base station first searches for dominant AoAs and AoDs. In order for the base station to determine the dominant $T_{AoA}$ AoAs of the downlink channel, the signal strength may be modeled as Equation 10 below.

$$\chi^r(\psi_i) = \|a_{AoA}{}^h(\psi_i)H_{CSI-RS}{}^H\| \quad \text{Equation 10}$$

In Equation 10, $\psi_i$ represents the i-th angle, $\chi^r(\psi_i)$ represents the signal strength for the i-th angle, $a_{AoA}(\hat{\Psi}_i)$ represents the array response vector from the terminal, and $H_{CSI-RS}$ represents the quantized channel information fed back from the terminal.

$$\psi_i = -\frac{\pi}{2} + \frac{\pi}{R_{ULA}}(i-1) \quad \text{Equation 11}$$

In Equation 11, $\psi_i$ represents the i-th angle, $\pi/R_{ULA}$ represents a resolution for Here, i has values of 1, 2, ..., $R_{ULA}$+1.

The base station may identify $T_{AoA}$ local maximums among $\chi^r(\Psi i)$ values according to each $\Psi_i$ and determine angles $\Psi_i$ corresponding to the identified local maximums as the dominant AoA $\hat{\Psi}_u$. Here, the angles $\Psi_i$ corresponding to local maximum values may be determined to satisfy the following Equation 12.

$$\chi_r(\psi_i) \geq \chi^r(\psi_{i+1}), \chi^r(\psi^i) \geq \chi^r(\psi_{i-1}) \quad \text{Equation 12}$$

In Equation 12, $\chi^r(\psi_i)$ represents the signal strength for the i-th angle.

The dominant $T_{AoD}$ AoDs may be determined based on $h_{SRS}$. When the base station operates the ULA, similar to Equation 10 and Equation 11, the angle $\mu_i$ and the corresponding signal strength may be modeled as Equation 13 and Equation 14 below.

$$\chi^t(\mu_i) = |a_{AoD}{}^H(\mu_i)h_{SRS}| \quad \text{Equation 13}$$

In Equation 13, $\mu_i$ represents the i-th angle, $\chi^t(\mu_i)$ represents the signal strength of the i-th angle, $a_{AoD}(\mu_i)$ represents the array response vector from the base station, and $h_{SRS}$ represents a channel matrix inferred using uplink RS.

$$\mu_i = -\frac{\pi}{2} + \frac{\pi}{R_{ULA}}(i-1) \quad \text{Equation 14}$$

In Equation 14, $\mu_i$ represents the i-th angle, $\pi/R_{ULA}$ represents a resolution for $\mu_i$. Here, i has values of 1, 2, ..., $R_{ULA}$+1.

Assuming that the base station operates the UPA, the signal strength corresponding to the vertical angle $\mu_{l_{ver}}$ and the horizontal angle $\mu_{l_{hor}}$ may be modeled as Equation 15 and Equation 16 below.

$$\chi^t(\mu_{l_{ver}}, \mu_{l_{hor}}) = |a_{AoD}{}^H(\mu_{l_{ver}}, \mu_{l_{hor}})h_{SRS}| \quad \text{Equation 15}$$

In Equation 15, $\mu_{l_{ver}}$ represents the vertical angle, $\mu_{l_{hor}}$ represents the horizontal angle, $\chi^t(\mu_{l_{ver}}, \mu_{l_{hor}})$ represents the signal strength corresponding to $\mu_{l_{ver}}$ and $\mu_{l_{hor}}$, $a_{AoD}(\mu_{l_{ver}}, \mu_{l_{hor}})$ represents the array response vector from the base station, and $h_{SRS}$ represents a channel matrix inferred using uplink RS.

$$\mu_{\ell_{ver}} = -\frac{\pi}{2} + \frac{\pi}{R_{UPA,ver}}(\ell_{ver} - 1) \quad \text{Equation 16}$$

$$\ell_{ver} = 1, 2R_{UPA_{ver}} + 1$$

$$\mu_{\ell_{hor}} = -\frac{\pi}{2} + \frac{\pi}{R_{UPA,hor}}(\ell_{hor} - 1)$$

$$\ell_{hor} = 1, 2R_{UPA,hor} + 1$$

In Equation 16, $\mu_{l_{ver}}$ represents the vertical angle, $\mu_{l_{hor}}$ represents the horizontal angle, $$\frac{\pi}{R_{UPA_{ver}}} \text{ and } \frac{\pi}{R_{UPA,hor}}$$

represent resolutions for $\mu_{l_{ver}}$ and $\mu_{l_{hor}}$. After the dominant AoAs are determined, a matrix $A_{AoA}$ having the size of $L_{max} \times T_{AoA}$ may be expressed as Equation 17 below.

$$A_{AoA} = [a_{AoA}(\hat{\psi}_1), a_{AoA}(\hat{\psi}_2), \ldots a_{AoA}(\hat{\psi}_{T_{AoA}})] \quad \text{Equation 17}$$

In Equation 17, $A_{AoA}$ represents the AoA value, $a_{AoA}(\hat{\psi}_u)$ represents the array response vector from the terminal.

The operation of determining the dominant AoDs may vary depending on which antenna array structure the base station operates. An algorithm in the case of operating ULA is described in Table 1 below, and an algorithm in case of operating UPA is described in Table 2 below. The algorithms presented in Table 1 or Table 2 below are only examples, and other AoD/AoA inference methods may be applied.

TABLE 1

| Algorithm 1 Estimation of the dominant AoDs for the ULA |
|---|
| 1: Initialize $O_{ULA}$ as an empty set |
| 2: h ← $h_{SRS}$ |
| 3: for υ = 1, 2, ..., $T_{AoD}$ do |
| 4:     Initialize $i_{max}$ |
| 5:     for i = 1, 2, ..., $R_{ULA}$ do |
| 6:         Calculate $\chi_i^t$ |
| 7:     end for |
| 8:     Calculate $i_{max} = \underset{i}{\operatorname{argmax}} \, \chi_i^t$ |
| 9:     $\hat{\mu}_v \leftarrow \mu_{i_{max}}$ |
| 10:    h ← h − ($h^H a_{AoD}(\hat{\mu}_v))a_{AoD}(\hat{\mu}_v)$ |
| 11:    $O_{ULA} \leftarrow \hat{\mu}_v$ |
| 12: end for |

TABLE 2

Algorithm 2 Estimation of the dominant AoDs for the UPA

1: Initialize $O_{UPA}$ as an empty set
2: $h \leftarrow h_{SRS}$
3: for $\upsilon = 1, 2, \ldots, T_{AoD}$ do
4:    Initialize $\ell_{ver,max}, \ell_{hor,max}$
5:    for $\ell_{ver} = 1, 2, \ldots, R_{UPA,ver}$ do
6:      for $\ell_{hor} = 1, 2, \ldots, R_{UPA,hor}$ do
7:        Calculate $\chi^t_{\ell_{ver},\ell_{hor}}$
8:    end for
9:    end for
10:   Calculate $\ell_{ver,max}, \ell_{hor,max} = \underset{\ell_{ver},\ell_{hor}}{\mathrm{argmax}} \; \chi^t_{\ell_{ver},\ell_{hor}}$
11:   $\hat{\mu}_{\upsilon,ver} \leftarrow \mu \ell_{ver,max}$
12:   $\hat{\mu}_{\upsilon,ver} \leftarrow \mu \ell_{hor,max}$
13:   $h \leftarrow h - (h^H a_{AoD}(\hat{\mu}_{\upsilon,ver}, \hat{\mu}_{\upsilon,hor})) a_{AoD}(\hat{\mu}_{\upsilon,ver}, \hat{\mu}_{\upsilon,hor})$
14:   $O_{UPA} \leftarrow (\hat{\mu}_{\upsilon,ver}, \hat{\mu}_{\upsilon,hor})$
15: end for After the dominant AoDs are determined, the matrix $A_{AoD}$ of $N_{BS} \times T_{AoD}$ size may be expressed as Equation 18 below when the base station operates ULA, and may be expressed as Equation 19 below when the base station operates UPA.

$$A_{AoD} = [a_{AoD}(\hat{\mu}_1), a_{AoD}(\hat{\mu}_2), \ldots, a_{AoD}(\hat{\mu}_{T_{AoD}})] \quad \text{Equation 18}$$

In Equation 18, $A_{AoD}$ represents the AoD value, $a_{AoD}(\hat{\mu}_\upsilon)$ represents the array response vector from the base station.

$$A_{AoD} = [a_{AoD}(\hat{\mu}_{1,ver}, \hat{\mu}_{2,hor}), a_{AoD}(\hat{\mu}_{2,ver}, \hat{\mu}_{2,hor}), \ldots, a_{AoD}(\hat{\mu}_{T_{AoD},ver}, \hat{\mu}_{T_{AoD},hor})] \quad \text{Equation 19}$$

In Equation 19, $A_{AoD}$ represents the AoD value, $a_{AoD}(\hat{\mu}_{v,ver}, \hat{\mu}_{v,hor})$ represents the array response vector from the base station.

After the dominant AoAs and AoDs are determined, in order to reconstruct the downlink channel H, the matrix $C_{pre}$ having $c_{u,v}$ as elements may be obtained through solving an optimization problem. The optimization problem may be expressed as Equation 20.

$$\hat{C}_{pre} = \underset{\hat{C}_1 \in \mathbb{C}^{T_{AoA} \times T_{AoD}}}{\mathrm{argmin}} \; \|A_{AoA} \hat{C}_1 A_{AoD}^H P - H_{CSI-RS}^H\|_F + \quad \text{Equation 20}$$

$$\lambda \|A_{AoA} \hat{C}_1 A_{AoD}^H (:, m_{Tx}) - h_{SRS}\|$$

In Equation 20, $\hat{C}_{pre}$ represents the optimal path gain vector, $T_{AoA}$ represents the number of dominant AoAs, $T_{AoD}$ represents the number of dominant AoDs, $A_{AoA}$ represents the AoA value, $\hat{C}_1$ represents the candidate value of the optimal path gain vector, P represents the precoding matrix, $A_{AoD}$ represents the AoD value, $H_{CSI-RS}$ represents a quantized channel matrix fed back from the terminal, $m_{TX}$ represents the index of the antenna used to transmit the uplink RS from the terminal, $h_{SRS}$ represents a channel matrix inferred using uplink RS, and $\lambda$ represents a regularization factor having a positive real value, and as $\lambda$ is larger, a greater weight is given to reduce the difference between the $m_{TX}$-th row of reconstructed channel information and the $h_{SRS}$.

The downlink channel reconstructed through the pre-search method may be expressed as Equation 21 below.

$$\hat{H}_{pre}^H = A_{AoA} \hat{C}_{pre} A_{AoD}^H \quad \text{Equation 21}$$

In Equation 21, $\hat{H}_{pre}^H$ represents the downlink channel reconstructed through the pre-search method, $A_{AoA}$ represents the AoA value, $\hat{C}_{pre}$ represents the optimal path gain vector, and $A_{AoD}$ represents the AoD value.

Thereafter, the $m_{TX}$-th row of $\hat{H}_{pre}^H$ is replaced with $h^H_{SRS}$ inferred through the uplink RS, which may be expressed as Equation 22.

$$\hat{H}_{pre}^H(m_{Tx},:) = h_{SRS}^H \quad \text{Equation 22}$$

In Equation 22, $\hat{H}_{pre}^H(m_{TX},:)$ represents the $m_{TX}$-th row of $\hat{H}_{pre}^H$, and $h_{SRS}$ represents a channel matrix inferred using an uplink RS.

As described above, channel information may be reconstructed according to the pre-search method using the AoA value and the AoD value. Here, the pre-search method requires solving an optimization problem in order to reconstruct a downlink channel. Solving the optimization problem may require very high complexity depending on the system. Accordingly, according to another embodiment, the optimization problem may be replaced with a simpler operation. A method of simplifying the optimization problem may be referred to as a 'pseudo-inverse method'.

Considering the channel structure exemplified in Equation 21, unquantized channel information may be approximated as Equation 23 below.

$$H_{CSI-RS-uq} \approx A_{AoA} C_2 A_{AoD}^H P \quad \text{Equation 23}$$

In Equation 23, $H_{CSI-RS-uq}$ represents an unquantized valid channel matrix, $A_{AoA}$ represents an AoA value, $C_2$ represents a path gain vector, $A_{AoD}$ represents an AoD value, and P represents a precoding matrix.

$A_{AoA}$ and $A_{AoD}$ may be determined in the same manner as the pre-search method described above. In this case, $T_{AoA}$ and $T_{AoD}$ are design variables selectable by the base station to determine the main AoAs and AoDs. Assuming the conditions of $T_{AoA} \leq L_{max}$ and $T_{AoD} \leq K$, there may be a left pseudo-inverse of $A_{AoA}$ and a right pseudo-inverse of $A^H_{AoD} P$. Accordingly, the operation of inferring the complex path gain matrix $C_2$ may be expressed as Equation 24, and the downlink channel reconstructed therethrough may be expressed as Equation 25.

$$\hat{C}_{pinv} = A_{AoA}^\dagger H_{CSI-RS}^H (A_{AoD}^H P)^\dagger \quad \text{Equation 24}$$

In Equation 24, $\hat{C}_{pinv}$ represents a path gain vector determined by pseudo-inverse, $A_{AoA}$ represents an AoA value, $H_{CSI-RS}$ represents a quantized channel matrix fed back from the terminal, $A_{AoD}$ represents an AoD value, and P represents a precoding matrix.

$$\hat{H}_{pinv} = A_{AoA} \hat{C}_{pinv} A_{AoD}^H \quad \text{Equation 25}$$

In Equation $\hat{H}_{pinv}$ represents a channel matrix inferred by the pseudo-inverse method, $A_{AoA}$ represents an AoA value, $\hat{C}_{pinv}$ represents a path gain vector determined by pseudo-inverse, and $A_{AoD}$ represents an AoD value.

Thereafter, the $m_{TX}$-th row of $\hat{H}_{pre}^h$ is replaced with $h^H_{SRS}$ inferred through the uplink RS, which may be expressed as above Equation 22.

According to the above-described various embodiments, channel information may be reconstructed. In reconstructing channel information, an operation of identifying an antenna of a terminal used to transmit an uplink RS, for example, SRS is performed.

According to an embodiment, the antenna (e.g., an $m_{TX}$-th antenna) of the terminal used to transmit the SRS may be treated as a predefined antenna. That is, the base station may not identify the antenna of the terminal used to transmit the SRS based on the obtained information (e.g., the second channel matrix), but may treat the SRS as being transmitted from the antenna of a specific index. In this case, the specific antenna index may be changed based on a predefined pattern according to the number of transmissions, time, and the like.

According to another embodiment, the antenna of the terminal used to transmit the SRS may be determined based on the second channel matrix and the first channel matrix. Due to channel reciprocity between downlink and uplink, the $m_{TX}$-th row of $h^H_{SRS}$ and downlink channel $H^H$ indicate information on the same channel. Therefore, it is expected that $h^H_{SRS}$ is most similar to the $m_{TX}$-th row of $H_{CSI-RS-uq}$. Based on this, the base station may identify the most similar row to the first channel matrix among the rows included in the first channel matrix, and determine the antenna corresponding to the identified row as the antenna of the terminal used to transmit the SRS. The similarity of the rows may be determined based on an error value or a dot product value. The method using the error value is expressed as Equation 26 below, and the method using the dot product value is expressed as Equation 27 below.

$$\hat{m}_{Tx} = \underset{m'}{\operatorname{argmin}} \| H^H_{CSI-RS}(m', :) - h^H_{SRS} P \| \quad \text{Equation 26}$$

In Equation 26, $\hat{m}_{Tx}$ represents an antenna index inferred to be used to transmit uplink RS, $H_{CSI-RS}$ represents a quantized channel matrix fed back from the terminal, $h_{SRS}$ represents a channel matrix inferred using uplink RS, and P represents a precoding matrix.

$$\hat{m}_{Tx} = \underset{m'}{\operatorname{argmax}} | H^H_{CSI-RS}(m', :)(h^H_{SRS} P)^H | \quad \text{Equation 27}$$

In Equation 27, $\hat{m}_{Tx}$ represents an antenna index inferred to be used to transmit uplink RS, $H_{CSI-RS}$ represents a quantized channel matrix fed back from the terminal, $h_{SRS}$ represents a channel matrix inferred using uplink RS, and P represents a precoding matrix.

Hereinafter, the disclosure describes a simulation result for confirming the performance of the channel reconstruction technology according to various embodiments described above. In this case, the downlink channel is defined based on a spatial channel model (SCM) widely used in the 3GPP standard, and the number of antennas of the base station is set to 32 (8 vertical and 4 horizontal when operating the UPA), the number of antennas of terminals is set to 4 or 2, and the maximum number of layers in the terminal is set to 4. When configuring the weighted antenna sub-array in the base station, J=8 is set, and as for the weight vector when configuring the sub-array, one column (e.g., the $j_{max}$-th column) is flexibly selected according to $h_{SRS}$ among eight columns of the 8×8 DFT matrix as illustrated in Equation 28 below.

$$j_{max} = \underset{j}{\operatorname{argmax}} | [D^H(j, :), 0^T_{N_{BS}-1}] h_{SRS} | \quad \text{Equation 28}$$

In Equation 28, D represents a DFT matrix, $N_{BS}$ represents the number of antennas of the base station, J represents the number of sub-arrays, and $h_{SRS}$ represents a channel matrix inferred using an uplink RS.

In downlink training through CSI-RS, the number of antenna ports of the base station is set to 4 and the regularization factor λ was set to 10, and the number of dominant AoAs and AoDs, $T_{AoA}$ and $T_{AoD}$ are set to L and 4, $R_{ULA}$ is set to 3600, $R_{UPA,ver}$ is set to 200, and $R_{UPA,hor}$ is set to 200.

The rate of the channel used as a performance indicator is defined as Equation 29, Equation 30, and Equation 31.

$$R = \log_2\left(\det\left(I_{L_{max}} + \frac{\rho}{L_{max}} F^H H H^H F\right)\right) \quad \text{Equation 29}$$

In Equation 29, R represents the rate, $L_{max}$ represents the maximum number of layers that may be supported by the terminal, and H represents a downlink channel.

$$\hat{H}^H = \hat{U}\hat{\Sigma}\hat{V}^H \quad \text{Equation 30}$$

In Equation 30, $\hat{H}^H$ represents the Hermitian of the inferred downlink channel, $\hat{U}$ represents the left-singular vector obtained by the singular value decomposition (SVD), $\hat{\Sigma}$ represents a diagonal matrix containing singular values, and $\hat{V}$ represents a right-singular vector obtained by singular value decomposition.

$$F = \hat{V}(:,1:L_{max}) \quad \text{Equation 31}$$

In Equation 31, $\hat{V}$ represents a right-singular vector obtained by singular value decomposition on $\hat{H}^H$.

FIGS. 11 to 14 illustrate performance graphs of a wireless communication system according to various embodiments of the disclosure. In the legends of FIGS. 11 to 14, 'CSI-RS' is a case in which F in Equation 31 is set to $P\hat{V}_{CSI-RS}$, and corresponds to a baseline in which downlink channel reconstruction is not performed. $\hat{V}_{CSI-RS}$ corresponds to a right singular matrix when $H_{CSI-RS}$ is decomposed into singular values as Equation 30. 'Pre-ULA' and 'Pre-UPA' are cases in which the base station operates ULA and UPA in the pre-search method, 'Pinv-ULA' and 'Pinv-UPA' are cases in which the base station operates ULA and UPA in a pseudo-inverse method, and 'Ideal' is a case in which an actual downlink channel is accurately known.

Figure 11:
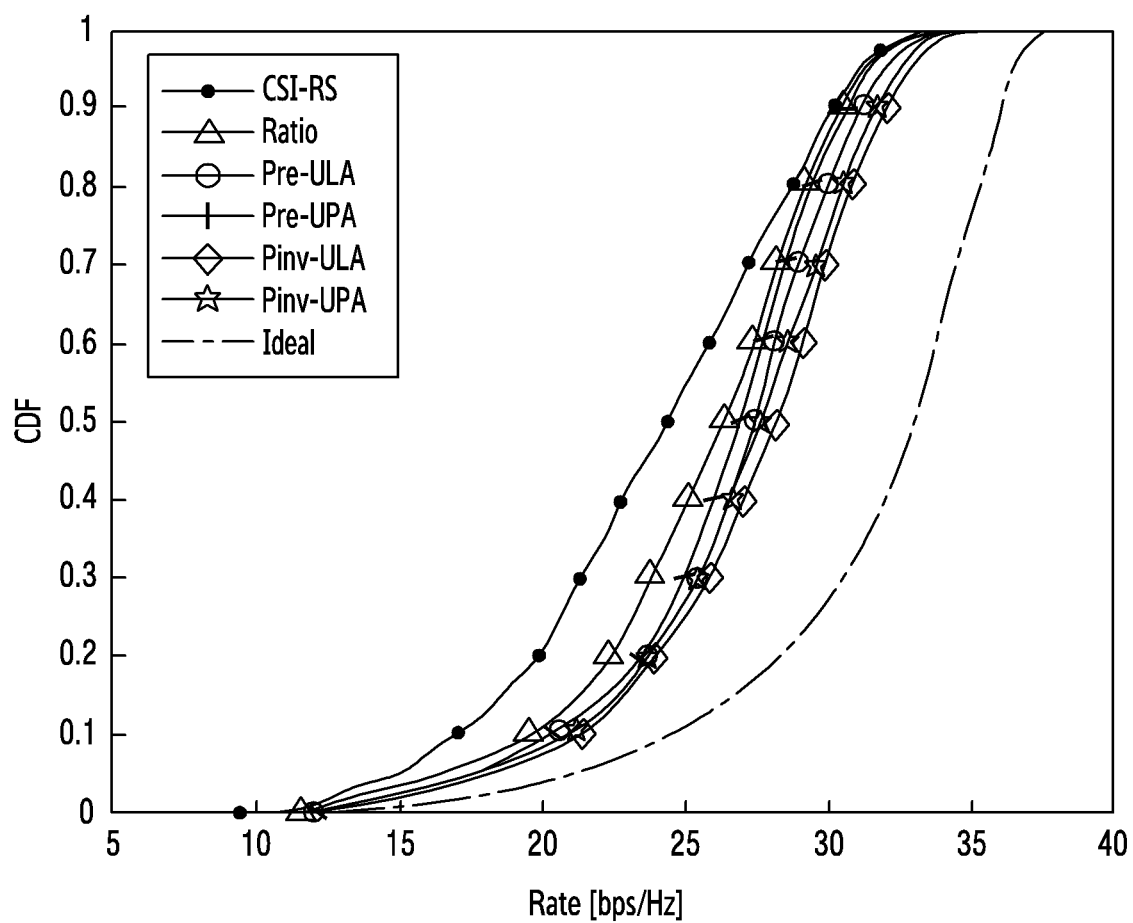
FIGS. 11, 12, 13, and 14 illustrate performance graphs of a wireless communication system according to various embodiments of the disclosure.

FIG. 11 illustrates a cumulative density function (CDF) of a rate when the base station operates a ULA according to an embodiment of the disclosure.

Referring to FIG. 11, it is confirmed that the downlink channel reconstruction methods according to various embodiments examined from the perspective of CDF of the rate have better performance than the case based only on the existing CSI-RS when spatial multiplexing is performed. The ratio method requires very simple operation, but has good performance because it is suitable for the structure of ULA. In addition, the pre-search method and the pseudo-inverse method illustrate better performance than the ratio method. In both pre-search and pseudo-inverse methods, the base station has better performance considering ULA structures when operating ULA.

Figure 12:
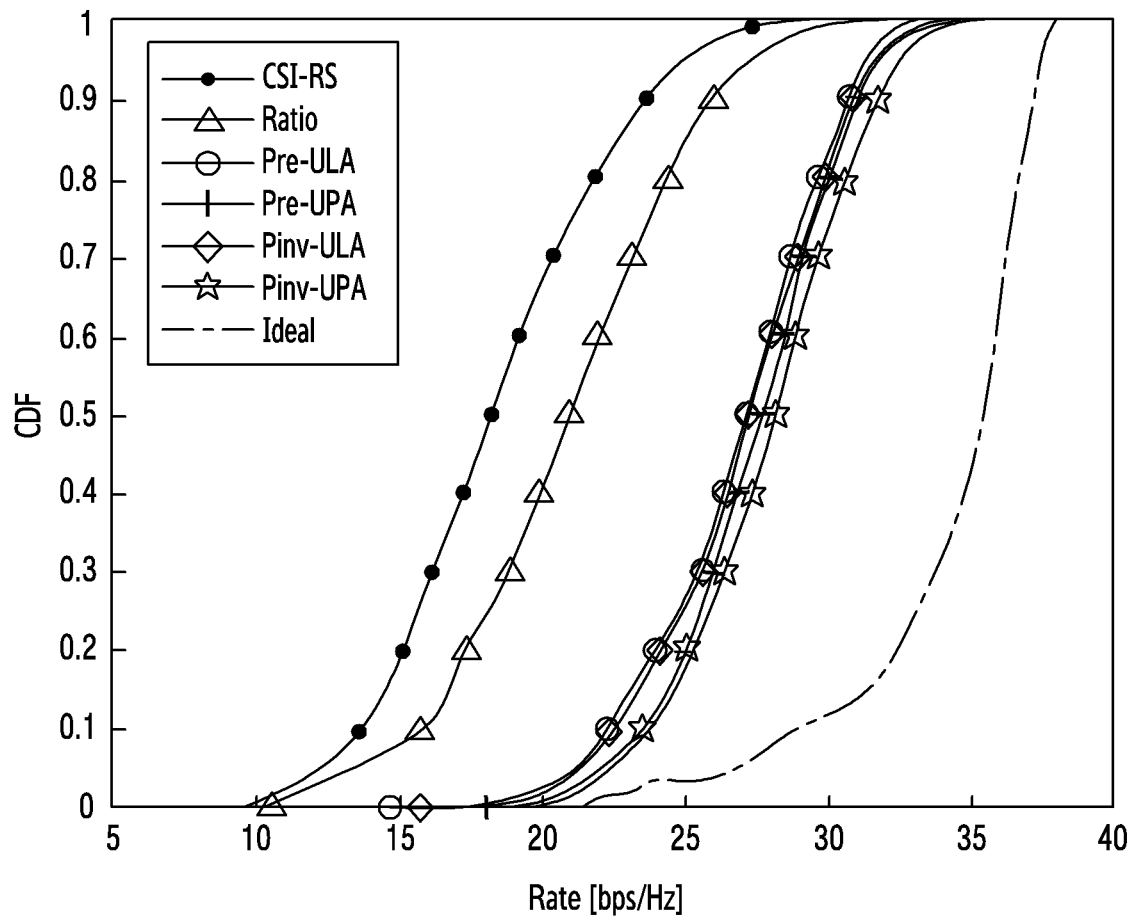

FIG. 12 illustrates a CDF of a rate when a base station operates a UPA according to an embodiment of the disclosure.

Referring to FIG. 12, similar to the result of FIG. 11, downlink channel reconstruction methods according to various embodiments have better performance than the case based only on the existing CSI-RS. Although the performance degradation of the ratio method is severe because the base station operates UPA, it is confirmed that the pre-search method and the pseudo-inverse method have excellent performance. In addition, because the base station operates UPA, it is confirmed that considering the UPA structure in pre-search method and pseudo-inverse method is more suitable for reconstruction of downlink channels.

Figure 13:
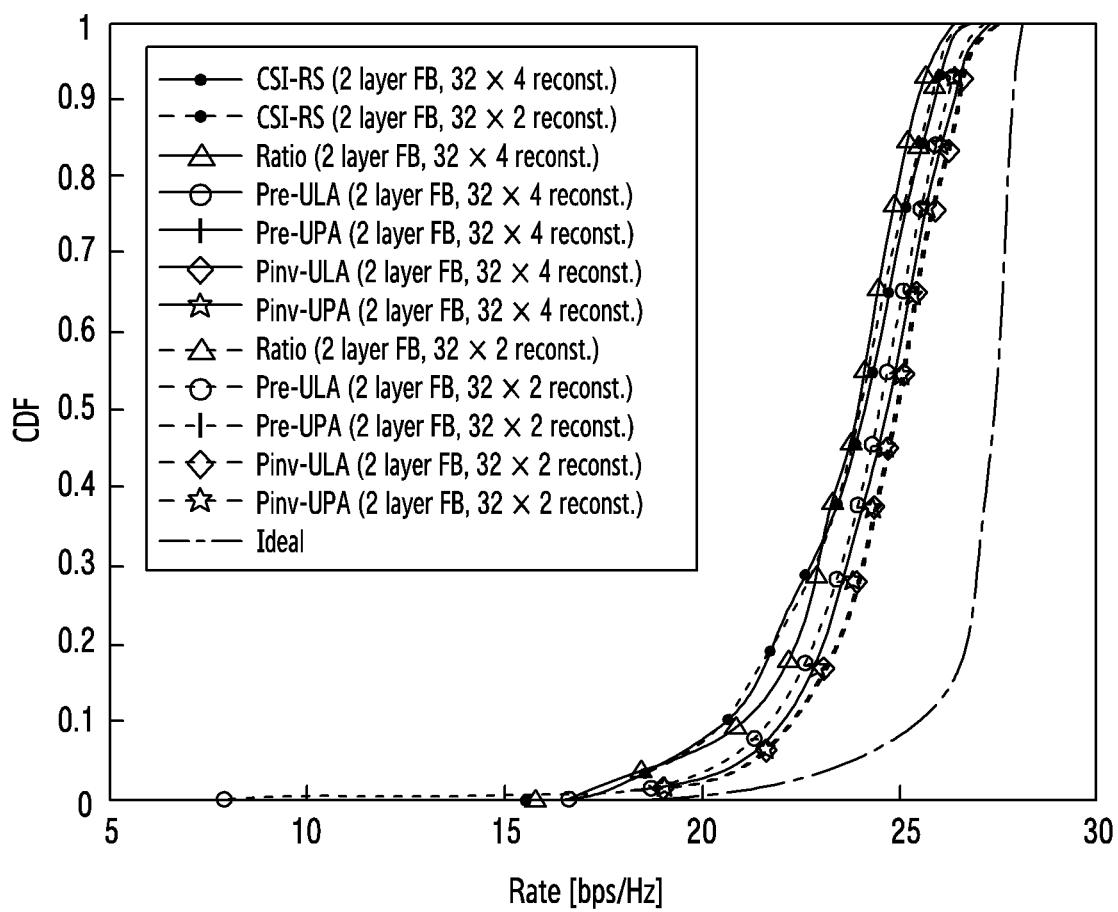

FIG. 13 illustrates a CDF of a rate when a base station operates a ULA and L is 2 according to an embodiment of the disclosure. In the legend of FIG. 13, '2 layer FB, 32 λ4 reconst.' indicates a case in which a downlink channel of $N_{BS} \times L_{max}$ size is reconstructed by converting the PMI codeword $H_{CSI-RS}$ of the K×L size to the codeword of the K×$L_{max}$ size having the same first column vector when L is 2 and L layers are transmitted. In this case, in Equation 31, F is assumed to be $\hat{V}(:,1:L)$. '2 layer FB, 32×2 reconst.' indicates a case in which a downlink channel of $N_{BS} \times L$ size is reconstructed using the PMI codeword $H_{CSI-RS}$ of K×L size when L is 2, and L layers are transmitted.

Referring to FIG. 13, similar to the results of FIG. 11, because the base station operates the ULA, it is confirmed that considering the ULA in the pre-search method and the pseudo-inverse method is more suitable for downlink channel reconstruction. In addition, overall, given that the rate of the '2 layer FB, 32×2 reconst.' case is higher, it is confirmed that the above-described downlink channel reconstruction methods operate appropriately even when L is less than $L_{max}$.

Figure 14:
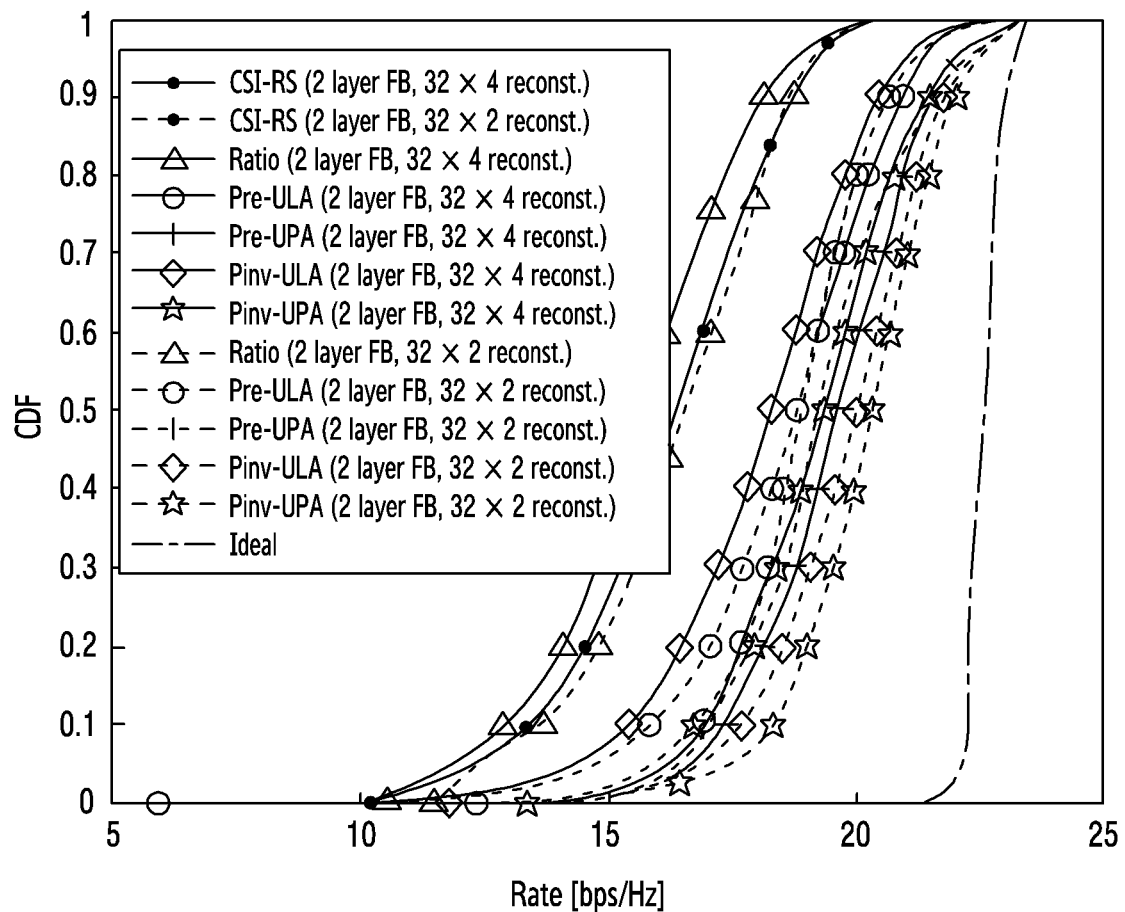

FIG. 14 illustrates a CDF of a rate when a base station operates a UPA and L is 2 according to an embodiment of the disclosure.

Referring to FIG. 14, similar to the results of FIG. 12, because the base station operates the UPA, it is confirmed that considering the UPA in the pre-search method and the pseudo-inverse method is more suitable for downlink channel reconstruction. In addition, as illustrated in FIG. 13, overall, it is confirmed that the rate of cases of '2 layer FB. 32×2 reconst' is higher. Accordingly, it is confirmed that the above-described downlink channel reconstruction methods operate properly even when L is smaller than $L_{max}$, regardless of which structure of the antenna array among ULA/UPA is used by the base station.

An operation method of a base station according to an embodiment of the disclosure as described above may include a process of transmitting a downlink reference signal (RS) to a terminal, a process of receiving an indication for the first channel matrix inferred by the terminal and at least one uplink RS, a process of inferring a second channel matrix based on the at least one uplink RS, and a process of reconstructing channel information to be used for data transmission based on the first channel matrix and the second channel matrix.

In one embodiment, the indication may indicate quantized channel information between antenna ports of the base station and antennas of the terminal.

In one embodiment, the at least one uplink RS may be transmitted from one of antennas used by the terminal to receive the downlink RSs.

In one embodiment, a process of identifying an antenna used to transmit the at least one uplink RS from the terminal may be further included.

In one embodiment, the antenna used to transmit the at least one uplink RS may be identified as a predefined antenna or an antenna corresponding to a row most similar to the second channel information among rows of the first channel matrix.

In one embodiment, the channel information may be reconstructed based on a ratio of channel values corresponding to the antennas of the terminal.

In one embodiment, the channel information may be reconstructed by determining ratios of a channel size for another antenna compared to an antenna used for transmitting the at least one uplink RS based on the first channel matrix, and by determining rows of channel information corresponding to another antennas from the second channel matrix based on the ratios.

In one embodiment, the channel information may be reconstructed based on an angle of arrival (AoA) value and an angle of departure (AoD) value of a channel.

In one embodiment, the channel information may be reconstructed by determining dominant AoAs included in the AoA value and dominant AoDs included in the AoD value, determining a channel matrix based on the AoA value and the AoD value by multiplying the AoA value, the AoD value, and a path gain value, and replacing one row of the channel matrix with the second channel matrix.

In one embodiment, the path gain value may be determined based on an optimization problem of minimizing a difference between channel inference based on the AoA value and the AoD value and the channel inference based on the RS, or by multiplying a pseudo-inverse of the AoA value and a pseudo-inverse of the AoD by the first channel matrix.

The base station according to an embodiment of the disclosure as described above may include a transceiver and at least one processor connected to the transceiver, and the at least one processor may be controlled to transmit downlink reference signals (RSs) to the terminal, receive an indication for a first channel matrix inferred by the terminal and at least one uplink RS, infer a second channel matrix based on at least one uplink RS, and reconstruct channel information to be used for data transmission based on the first channel matrix and the second channel matrix.

In one embodiment, the indication may indicate quantized channel information between antenna ports of the base station and antennas of the terminal.

In one embodiment, the at least one uplink RS may be transmitted from one of antennas used by the terminal to receive the downlink RSs.

In one embodiment, the at least one processor may identify an antenna used to transmit the at least one uplink RS from the terminal.

In one embodiment, the antenna used to transmit the at least one uplink RS may be identified as a predefined antenna or an antenna corresponding to a row most similar to the second channel information among rows of the first channel matrix.

In one embodiment, the channel information may be reconstructed based on a ratio of channel values corresponding to the antennas of the terminal.

In one embodiment, the channel information may be reconstructed by determining ratios of a channel size for another antenna compared to an antenna used for transmitting the at least one uplink RS based on the first channel matrix, and by determining rows of channel information corresponding to another antennas from the second channel matrix based on the ratios.

In one embodiment, the channel information may be reconstructed based on an angle of arrival (AoA) value and an angle of departure (AoD) value of a channel.

In one embodiment, the channel information may be reconstructed by determining dominant AoAs included in the AoA value and dominant AoDs included in the AoD value, determining a channel matrix based on the AoA value and the AoD value by multiplying the AoA value, the AoD value, and a path gain value, and replacing one row of the channel matrix with the second channel matrix.

In one embodiment, the path gain value may be determined based on an optimization problem of minimizing a difference between channel inference based on the AoA value and the AoD value and the channel inference based on the RS, or by multiplying a pseudo-inverse of the AoA value and a pseudo-inverse of the AoD by the first channel matrix.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in nonvolatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station in a wireless communication system, the method comprising:
   transmitting downlink reference signals (RSs) to a terminal;
   receiving an indication for a first channel matrix inferred by the terminal and at least one uplink RS from the terminal;
   inferring a second channel matrix based on the at least one uplink RS; and
   reconstructing channel information to be used for data transmission based on the first channel matrix and the second channel matrix,
   wherein the indication indicates quantized channel information between antenna ports of the base station and antennas of the terminal, and
   wherein the second channel matrix indicates channel information between one antenna used for transmitting the at least one uplink RS and antenna ports of the base station.

2. The method of claim 1, wherein the at least one uplink RS is transmitted from one of antennas used by the terminal to receive the downlink RSs.

3. The method of claim 1, further comprising identifying an antenna used to transmit the at least one uplink RS from the terminal.

4. The method of claim 3, wherein the antenna used to transmit the at least one uplink RS is identified as a predefined antenna or an antenna corresponding to a row most similar to the second channel matrix among rows of the first channel matrix.

5. The method of claim 1, wherein the reconstructing of the channel information is based on a ratio of channel values corresponding to antennas of the terminal.

6. The method of claim 5, wherein the reconstructing of the channel information further comprises:
   determining ratios of a channel size for a first antenna of the antennas of the terminal compared to an antenna used for transmitting the at least one uplink RS based on the first channel matrix; and
   determining rows of channel information corresponding to other antennas from among the antennas of the terminal other than the first antenna from the second channel matrix based on the ratios.

7. The method of claim 1, wherein the reconstructing of the channel information is based on an angle of arrival (AoA) value and an angle of departure (AoD) value of a channel.

8. The method of claim 7, wherein the reconstructing of the channel information comprises:
   determining dominant AoAs included in the AoA value and dominant AoDs included in the AoD value;
   determining a channel matrix based on the AoA value and the AoD value by multiplying the AoA value, the AoD value, and a path gain value; and
   replacing one row of the channel matrix with the second channel matrix.

9. The method of claim 8, wherein the path gain value is determined based on one of an optimization problem of minimizing a difference between channel inference based on the AoA value and the AoD value and the channel inference based on the downlink RSs and the at least one uplink RS, or by multiplying a pseudo-inverse of the AoA value and a pseudo-inverse of the AoD by the first channel matrix.

10. A base station in a wireless communication system, the base station comprising:
    a transceiver; and
    at least one processor connected to the transceiver, wherein the at least one processor is controlled to:
    transmit downlink reference signals (RSs) to a terminal,
    receive an indication for a first channel matrix inferred by the terminal and at least one uplink RS from the terminal,
    infer a second channel matrix based on at least one uplink RS, and reconstruct channel information to be used for data transmission based on the first channel matrix and the second channel matrix,
    wherein the indication indicates quantized channel information between antenna ports of the base station and antennas of the terminal, and wherein the second channel matrix indicates channel information between one antenna used for transmitting the at least one uplink RS and antenna ports of the base station.

11. The base station of claim 10, wherein the at least one uplink RS is transmitted from one of antennas used by the terminal to receive the downlink RSs.

12. The base station of claim 10, wherein the at least one processor identifies an antenna used to transmit the at least one uplink RS from the terminal.

13. The base station of claim 12, wherein the antenna used to transmit the at least one uplink RS is identified as a predefined antenna or an antenna corresponding to a row most similar to the second channel matrix among rows of the first channel matrix.

14. The base station of claim 10, wherein the channel information is based on a ratio of channel values corresponding to antennas of the terminal.

15. The base station of claim 14, wherein the at least one processor is further configured to:
  determine ratios of a channel size for a first antenna of the antennas of the terminal compared to an antenna used for transmitting the at least one uplink RS based on the first channel matrix; and
  determine rows of channel information corresponding to other antennas from among the antennas of the terminal other than the first antenna from the second channel matrix based on the ratios.

16. The base station of claim 10, wherein the channel information is based on an angle of arrival (AoA) value and an angle of departure (AoD) value of a channel.

17. The base station of claim 16, wherein the at least one processor is further configured to:
  determine dominant AoAs included in the AoA value and dominant AoDs included in the AoD value;
  determine a channel matrix based on the AoA value and the AoD value by multiplying the AoA value, the AoD value, and a path gain value; and
  replace one row of the channel matrix with the second channel matrix.

18. The base station of claim 17, wherein the path gain value is determined based on one of an optimization problem of minimizing a difference between channel inference based on the AoA value and the AoD value and the channel inference based on the downlink RSs and the at least one uplink RS, or by multiplying a pseudo-inverse of the AoA value and a pseudo-inverse of the AoD by the first channel matrix.

* * * * *